United States Patent
Lu et al.

(10) Patent No.: US 12,288,089 B2
(45) Date of Patent: Apr. 29, 2025

(54) SNAPSHOT-BASED VIRTUAL MACHINE TRANSFER ACROSS HYPERVISORS

(71) Applicant: Rubrik, Inc., Palo Alto, CA (US)

(72) Inventors: Feng Lu, Fremont, CA (US); Karthik Narasandra Manjunatha Rao, Newark, CA (US); Disheng Su, San Jose, CA (US); Li Ding, Cupertino, CA (US)

(73) Assignee: Rubrik, Inc., Palo Alto, CA (US)

( * ) Notice: Subject to any disclaimer, the term of this patent is extended or adjusted under 35 U.S.C. 154(b) by 489 days.

(21) Appl. No.: 17/707,352

(22) Filed: Mar. 29, 2022

(65) Prior Publication Data

US 2023/0315503 A1 Oct. 5, 2023

(51) Int. Cl.
*G06F 9/455* (2018.01)
*G06F 16/25* (2019.01)

(52) U.S. Cl.
CPC ........ *G06F 9/45558* (2013.01); *G06F 16/256* (2019.01); *G06F 16/258* (2019.01); *G06F 2009/4557* (2013.01)

(58) Field of Classification Search
None
See application file for complete search history.

(56) References Cited

U.S. PATENT DOCUMENTS

| | | | |
|---|---|---|---|
| 8,196,138 B2* | 6/2012 | Allwell | G06F 9/45558 718/1 |
| 9,047,238 B2* | 6/2015 | Zaslavsky | G06F 11/1451 |
| 9,086,903 B2* | 7/2015 | Khatri | G06F 3/0619 |
| 9,092,837 B2* | 7/2015 | Bala | G06F 9/461 |
| 9,146,769 B1* | 9/2015 | Shankar | H04L 67/10 |
| 9,298,491 B2* | 3/2016 | Chan | G06F 9/45558 |
| 9,715,347 B2* | 7/2017 | Ryu | G06F 3/065 |
| 10,162,667 B2* | 12/2018 | Sathyamurthy | G06F 9/4856 |
| 10,503,612 B1* | 12/2019 | Wang | G06F 11/2023 |
| 10,713,183 B2* | 7/2020 | Frenkel | G06F 9/45558 |
| 2016/0335007 A1* | 11/2016 | Ryu | G06F 3/0665 |

* cited by examiner

*Primary Examiner* — Van H Nguyen
(74) *Attorney, Agent, or Firm* — Holland & Hart LLP

(57) ABSTRACT

A method for transferring virtual machines across hypervisors is described. According to the method, a data management system may interface with a first hypervisor platform and a second hypervisor platform. The data management system may obtain a snapshot of a first virtual machine executing on the first hypervisor platform. The snapshot may include data and metadata associated with the first virtual machine in a first format that is supported by the first hypervisor platform. The data management system may extract the data and the metadata from the snapshot of the first virtual machine and convert the data and the metadata from the first format to a second format that is supported by the second hypervisor platform. The data management system may transfer the data and the metadata in the second format to a second virtual machine executing on the second hypervisor platform.

20 Claims, 13 Drawing Sheets

SNAPSHOT-BASED VIRTUAL MACHINE TRANSFER ACROSS HYPERVISORS

FIELD OF TECHNOLOGY

The present disclosure relates generally to database systems and data processing, and more specifically to snapshot-based virtual machine transfer across hypervisors.

BACKGROUND

A cloud environment may be employed by one or more users to store, manage, and process data using a shared network of remote servers. Each server may include a hypervisor that may provide a virtual operating platform for running one or more virtual machines within the server. A data management system may be a computing system employed to manage, process, backup, and restore data using a network of computing devices. For example, a data management system may be employed by a user to manage backup and restoration of virtual machines of the user that are executing within one or more hypervisor platforms.

In some systems, the data management system may obtain a backup of a virtual machine executing on a hypervisor platform and retore the virtual machine to the same hypervisor platform based on the backup. The data management system may not be able to restore the backup of the virtual machine to another hypervisor due to, for example, differences in formats or other incompatibilities associated with different hypervisor platforms, which may increase costs and impose some security threats.

DETAILED DESCRIPTION

Figure 1:
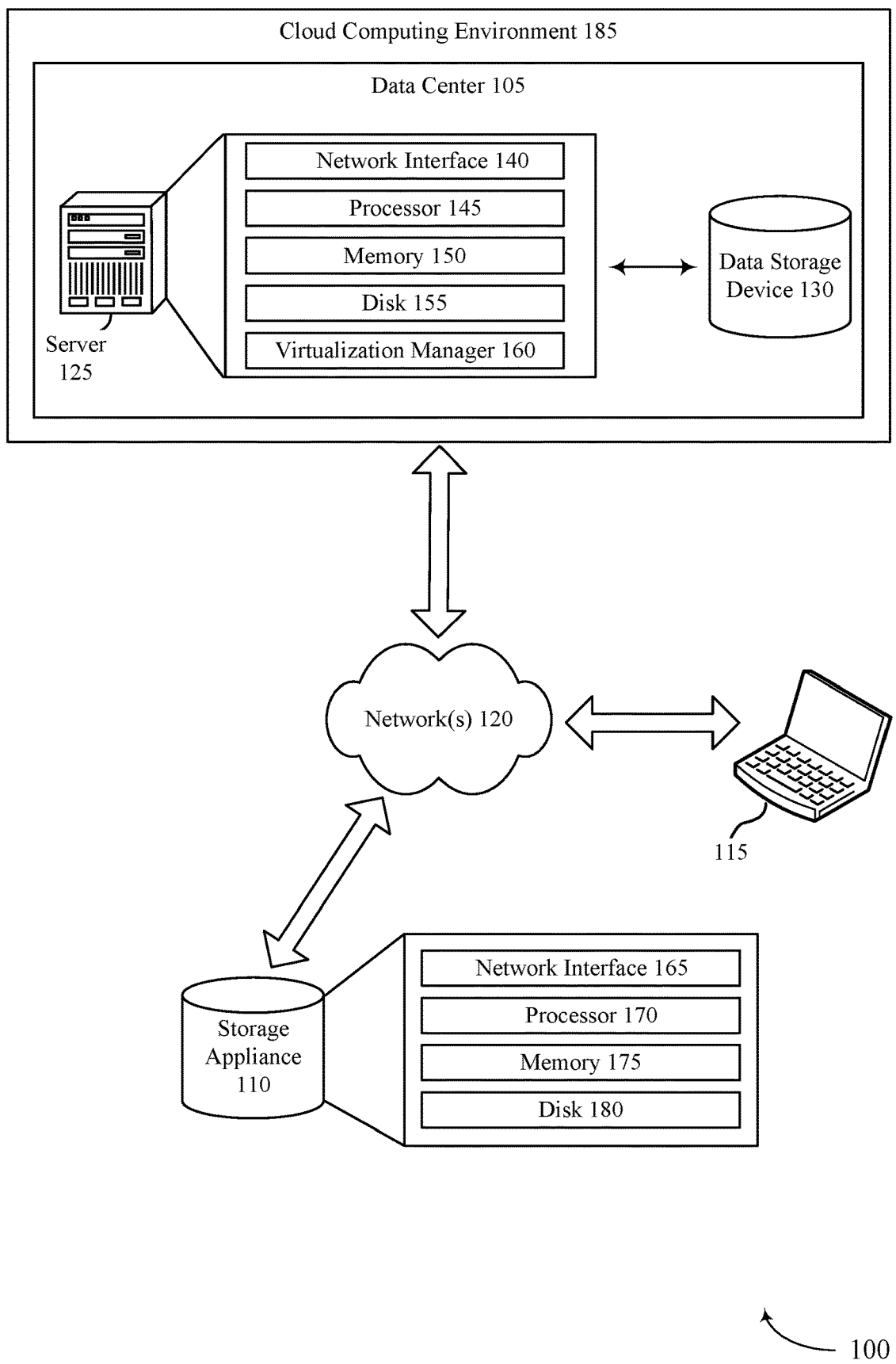
FIG. 1 illustrates an example of a computing environment that supports snapshot-based virtual machine transfer across hypervisors in accordance with aspects of the present disclosure.

A networked computing environment may provide services to multiple customers, which may be referred to as tenants, users, clients, or enterprises. The networked computing environment may provide a shared network of remote servers operable to process, store, and manage enterprise data for the customers. Each server within the network may include one or more hypervisors, which may represent software-level components of the server that may provide a virtual operating platform for running virtual machines within the server. The virtual operating platform may be referred to as a hypervisor platform herein, and a company that provides the hypervisor and corresponding hypervisor platform may be referred to as a hypervisor vendor. A data management service (e.g., a cloud data management (CDM) service), may provide services to a customer to manage backup and restoration of virtual machines that run on the hypervisor platforms within the networked computing environment. For example, the data management system may obtain and store snapshots of virtual machines executing on a hypervisor platform, and the data management system may restore a virtual machine to the hypervisor platform based on a previously stored snapshot. In some systems, however, the data management system may not support restoration of a first virtual machine associated with a first hypervisor platform (e.g., a source platform) to other, different hypervisor platforms (e.g., target platforms) due to, for example, differences in virtual machine configurations or formats.

Techniques described herein provide for a data management system to transfer data and metadata associated with a snapshot of a virtual machine running on a first hypervisor platform to a second hypervisor platform. For example, the data management system may restore a virtual machine to a second hypervisor platform based on a snapshot of the virtual machine obtained from a first hypervisor platform. To export or restore a backup across hypervisor platforms, the data management system may obtain the snapshot of a first virtual machine running on a first hypervisor platform. The data management system may obtain the snapshot periodically, in response to a request from a user, or both. The data management system may extract data and metadata from the snapshot of the first virtual machine and convert a format of the data and the metadata from a first format supported by the first hypervisor platform to a second format that is supported by the second hypervisor platform. The data management system may transfer the data and metadata in the second format to a second virtual machine executing on the second hypervisor platform.

In some aspects, to transfer the data and the metadata to the second hypervisor platform, the data management system may instruct the second hypervisor platform to create the second virtual machine based on a configuration of the first virtual machine. The second virtual machine may, for example, be configured with a same storage capacity or one or more other configuration settings that are the same as the first virtual machine. The data management system may export the data and the metadata to the second virtual machine. Additionally or alternatively, the data management system may mount the data and the metadata to the second virtual machine (e.g., a live mount), such that the data and the metadata are accessible to the second virtual machine, but are hosted by the data management system. In some aspects, the second virtual machine may be an existing virtual machine that is executing on the second hypervisor platform according to a configuration that is the same as or similar to the configuration of the first virtual machine executing on the first hypervisor platform. In such cases, the data management system may mount the data and the metadata to the second virtual machine executing on the second hypervisor platform, which may be referred to as instant recovery.

The described techniques for snapshot restoration across hypervisor platforms provide for improved reliability and security, as well as reduced customer costs associated with data backup and restoration services. By acquiring a backup of a virtual machine executing on a first hypervisor platform and recovering the virtual machine to a second hypervisor platform using the backup, the data management system may support faster recovery from, for example, a ransomware attack on the first hypervisor platform, a disaster recovery scenario, or some other condition that may cause corruption or a lost connection of the first hypervisor platform. As another example, a customer may pay a first hypervisor vendor to manage and store a primary version of the customer's data on a first hypervisor platform. The customer may utilize the described restoration techniques across hypervisor vendors to create a recovery site with sufficient capacity on a second hypervisor platform associated with a second hypervisor vendor that may be cheaper than the first hypervisor vendor. In case of an outage of the first hypervisor platform, the customer's data may be restored to the second hypervisor platform, which may provide for reliable data backup and restoration at a reduced expense to the customer.

Aspects of the disclosure are initially described in the context of an environment supporting virtual machine restoration across hypervisors. Additional aspects of the disclosure are described with reference to hypervisor platform architectures, snapshot export adaption processes, and process flows. Aspects of the disclosure are further illustrated by and described with reference to apparatus diagrams, system diagrams, and flowcharts that relate to snapshot-based virtual machine transfer across hypervisors.

FIG. 1 illustrates an example of a computing environment 100 for cloud computing that supports snapshot-based virtual machine transfer across hypervisors in accordance with aspects of the present disclosure. The computing environment 100 may include a data center 105, a storage appliance 110, and a computing device 115 in communication with each other via one or more networks 120. The computing environment 100 may also include one or more computing devices interconnected through one or more networks 120. The one or more networks 120 may allow computing devices or storage devices to connect to and communicate with other computing devices or other storage devices. In some examples, the computing environment 100 may include other computing devices or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a solid-state drive, or a data storage system.

The computing environment 100 may include a cloud computing environment 185 for one or more computing devices. Cloud computing may refer to Internet-based computing, wherein shared resources, software, and/or information may be provided to one or more computing devices on-demand via the Internet. The computing environment 100 may comprise a cloud computing environment 185 providing Software-as-a-Service (SaaS) or Infrastructure-as-a-Service (IaaS) services. SaaS may refer to a software distribution model in which applications are hosted by a service provider and made available to end users over the Internet. In one example, the computing environment 100 may include a virtualized infrastructure that provides software, data processing, and/or data storage services to end users accessing the services via the cloud computing environment 185. In one example, the cloud computing environment 185 may provide cloud-based work productivity or business-related applications to a computing device, such as computing device 115. In some examples, the cloud computing environment 185 may include a collection of one or more data centers 105. For example, applications and files for one or more clients that use the cloud computing environment 185 may be stored in one or more data centers 105. The example illustrated in FIG. 1 shows one cloud computing environment 185 and one data center 105, but it is to be understood that there may be any quantity of different cloud computing environments 185 and data centers 105. The data centers 105 may each be associated with or include any quantity of servers 125 and data storage devices 130.

In some examples, the computing environment 100, the cloud computing environment 185, or both may provide remote access to secure applications and files stored within data center 105 from a remote computing device, such as computing device 115. The data center 105 may use an access control application to manage remote access to protected resources, such as protected applications, databases, or files located within the data center 105. To facilitate remote access to secure applications and files, a secure network connection may be established using a virtual private network (VPN). A VPN connection may allow a remote computing device, such as computing device 115, to securely access data from a private network (e.g., from a company file server or mail server) using an unsecure public network or the Internet. The VPN connection may use client-side software (e.g., running on the remote computing device) to establish and maintain the VPN connection. The VPN client software may provide data encryption and encapsulation prior to the transmission of secure private network traffic through the Internet.

The computing device 115 may be a personal computing device, such as a stationary device (e.g., a desktop computer or access point) or a mobile device (e.g., a cellular phone, laptop, table, personal digital assistant). The computing device 115 may be a commercial computing device, such as a server or collection of servers. The computing device may be a virtual device, e.g., a virtual machine.

The data center 105 may include one or more servers, such as server 125, and one or more storage devices, such as storage device 130, that are in communication with the one or more servers.

A server, such as server 125, may allow a client to download information or files (e.g., executable, text, application, audio, image, or video files) from the server 125 or to perform a search query related to particular information stored on the server 125. In some examples, a server may act as an application server or a file server. In general, server 125 may refer to a hardware device that acts as the host in a client-server relationship or a software process that shares a resource with or performs work for one or more clients. In some examples, the server 125 may be used to create and manage one or more virtual machines associated with a virtualized infrastructure. The one or more virtual machines may run various applications, such as a database application or a web server. The server 125 may include a network interface 140, processor 145, memory 150, disk 155, and virtualization manager 160 all in communication with each other.

Network interface 140 may enable server 125 to connect to one or more networks 120. Network interface 140 may include a wireless network interface and/or a wired network interface. Processor 145 may enable server 125 to execute computer-readable instructions stored in memory 150 in order to perform processes described herein. Processor 145 may include one or more processing units, such as one or more central processing units (CPUs) and/or one or more GPUs. Memory 150 may comprise one or more types of memory (e.g., RAM, SRAM, DRAM, ROM, EEPROM, Flash, etc.). Disk 155 may include a hard disk drive and/or a solid-state drive. Memory 150 and disk 155 may comprise hardware storage devices.

The virtualization manager 160 may manage a virtualized infrastructure and perform management operations associated with the virtualized infrastructure. The virtualization manager 160 may manage the provisioning of virtual machines running within the virtualized infrastructure and provide an interface to computing devices interacting with the virtualized infrastructure. In one example, the virtualization manager 160 may set a virtual machine having a virtual disk into a frozen state in response to a snapshot request made via an application programming interface (API) by a storage appliance, such as a storage appliance within data center 105 or storage appliance 110. Setting the virtual machine into a frozen state may allow a point in time snapshot of the virtual machine to be stored or transferred. In one example, updates made to a virtual machine that has been set into a frozen state may be written to a separate file (e.g., an update file) while the virtual disk may be set into a read-only state to prevent modifications to the virtual disk file while the virtual machine is in the frozen state.

The virtualization manager 160 may then transfer data associated with the virtual machine (e.g., an image of the virtual machine or a portion of the image of the virtual disk file associated with the state of the virtual disk at the point in time it is frozen) to a storage appliance (for example, a storage appliance within data center 105 or storage appliance 110 of FIG. 1, described further below) in response to a request made by the storage appliance. After the data associated with the point in time snapshot of the virtual machine has been transferred to the storage appliance, the virtual machine may be released from the frozen state (i.e., unfrozen) and the updates made to the virtual machine and stored in the separate file may be merged into the virtual disk file. The virtualization manager 160 may perform various virtual machine-related tasks, such as cloning virtual machines, creating new virtual machines, monitoring the state of virtual machines, moving virtual machines between physical hosts for load balancing purposes, and facilitating backups of virtual machines.

The storage device 130 may include one or more hardware storage devices for storing data, such as a hard disk drive (HDD), a magnetic tape drive, a solid-state drive (SSD), a storage area network (SAN) storage device, or a Network-Attached Storage (NAS) device. In some cases, a data center, such as data center 105, may include multiple servers and/or data storage devices in communication with each other. The one or more data storage devices may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

In some examples, the data center 105 includes a storage appliance (e.g., the storage appliance 110) that includes a data management system for backing up virtual machines or files within a virtualized infrastructure. A storage appliance within data center may be configured similar to storage appliance 110. In some examples, a storage appliance in data center is an extension of storage appliance 110. For example, a storage appliance in data center may be an agent for storage appliance 110, where the agent may be implemented as software (e.g., installed at server 125 or at a central server) or as hardware in data center 105. When implemented as hardware, the server 125 and storage appliance may be in communication with each other via a networking fabric connecting servers and data storage units within the data center 105 to each other.

The one or more networks 120 may allow computing devices or storage devices to connect to and communicate with other computing devices or other storage devices in computing environment 100. The one or more networks 120 may include a secure network such as an enterprise private network, an unsecure network such as a wireless open network, a local area network (LAN), a wide area network (WAN), and the Internet. The one or more networks 120 may include a cellular network, a mobile network, a wireless network, or a wired network. Each network of the one or more networks 120 may include hubs, bridges, routers, switches, and wired transmission media such as a direct-wired connection. The one or more networks 120 may include an extranet or other private network for securely sharing information or providing controlled access to applications or files.

The storage appliance 110 may comprise a cloud-based data management system for backing up virtual machines and/or files within a virtualized infrastructure, such as virtual machines running on server 125 or files stored on server 125. The storage appliance 110 may include multiple machines, and the multiple machines may comprise multiple nodes of a server cluster. The server cluster may comprise a set of physical machines that are connected together via a network. The server cluster may be used for storing data associated with a plurality of virtual machines, such as backup data associated with different point-in-time versions of the virtual machines. The storage appliance may include a network interface 165, processor 170, memory 175, and disk 180, which may be configured similarly as the corresponding components of server 125.

In some examples, the storage appliance 110 may manage the extraction and storage of virtual machine snapshots associated with different point in time versions of one or more virtual machines running within the data center 105. A snapshot of a virtual machine may correspond with a state of the virtual machine at a particular point-in-time. In response to a restore command from the storage device 130, the storage appliance 110 may restore a point-in-time version of a virtual machine or restore point-in-time versions of one or more files located on the virtual machine and transmit the restored data to the server 125. In response to a mount command from the server 125, the storage appliance 110 may allow a point-in-time version of a virtual machine to be mounted and allow the server 125 to read and/or modify data associated with the point-in-time version of the virtual machine. To improve storage density, the storage appliance 110 may deduplicate and compress data associated with different versions of a virtual machine and/or deduplicate and compress data associated with different virtual machines. To improve system performance, the storage appliance 110 may first store virtual machine snapshots received from a virtualized environment in a cache, such as a flash-based cache. The cache may also store popular data or frequently accessed data (e.g., based on a history of virtual machine restorations, incremental files associated with commonly restored virtual machine versions) and current day incremental files or incremental files corresponding with snapshots captured within the past 24 hours.

An incremental file may comprise a forward incremental file or a reverse incremental file. A forward incremental file may include a set of data representing changes that have occurred since an earlier point-in-time snapshot of a virtual machine. To generate a snapshot of the virtual machine corresponding with a forward incremental file, the forward incremental file may be combined with an earlier point in time snapshot of the virtual machine (e.g., the forward incremental file may be combined with the last full image of the virtual machine that was captured before the forward incremental file was captured and any other forward incremental files that were captured subsequent to the last full image and prior to the forward incremental file). A reverse incremental file may include a set of data representing changes from a later point-in-time snapshot of a virtual machine. To generate a snapshot of the virtual machine corresponding with a reverse incremental file, the reverse incremental file may be combined with a later point-in-time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 110 may provide a user interface (e.g., a web-based interface or a graphical user interface) that displays virtual machine backup information such as identifications of the virtual machines protected and the historical versions or time machine views for each of the virtual machines protected. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

The user interface may enable an end user of the storage appliance 110 (e.g., a system administrator or a virtualization administrator) to select a particular version of a virtual machine to be restored or mounted. When a particular version of a virtual machine has been mounted, the particular version may be accessed by a client (e.g., a virtual machine, a physical machine, or a computing device) as if the particular version was local to the client. A mounted version of a virtual machine may correspond with a mount point directory (e.g., /snapshots/VM5Nersion23). In one example, the storage appliance 110 may run a Network File System (NFS) server and make the particular version (or a copy of the particular version) of the virtual machine accessible for reading and/or writing. The end user of the storage appliance 110 may then select the particular version to be mounted and run an application (e.g., a data analytics application) using the mounted version of the virtual machine. In another example, the particular version may be mounted as an Internet Small Computer Systems Interface (iSCSI) target.

In some examples, storage appliance 110 is located within data center 105. In some examples, a storage appliance within data center 105 may similarly perform (e.g., instead of or in combination with storage appliance 110) the operations and functions described with reference to storage appliance 110.

Techniques described herein may support restoration of virtual machines across two or more different hypervisor platforms. Each hypervisor platform may be associated with or distributed by a respective hypervisor vendor. In some aspects, a server 125 may execute one or more hypervisor platforms for operating one or more virtual machines. A data management system within a storage appliance 110 may be operable to obtain and store snapshots of virtual machines that run on different hypervisor platforms within one or more servers 125. The described techniques provide for the data management system to restore a virtual machine that executes on a first hypervisor platform to a different hypervisor platform.

To restore virtual machines across hypervisor platforms as described herein, the data management system may obtain a snapshot of a first virtual machine running on a first hypervisor platform. The data management system may obtain the snapshot periodically or in response to a request from a user. The data management system may extract data and metadata from the snapshot, convert a format of the data and metadata from a first format supported by the first hypervisor platform to a second format that is supported by a second (target) hypervisor platform, and transfer the data and the metadata to a second virtual machine running on the second hypervisor platform. In some aspects, the data management system may instruct the second hypervisor platform to create the second virtual machine based on a configuration of the first virtual machine. The data management system may export the data and the metadata to the second virtual machine accordingly. Alternatively, the data management system may mount the data and the metadata to the second virtual machine (e.g., a live mount). In some aspects, the data management system may mount the data and metadata to an existing virtual machine executing on the second hypervisor platform (e.g., instant recovery).

The data management system described herein may thus support relatively fast recovery of enterprise data after ransomware attacks or in other disaster recovery scenarios. For example, if a ransomware attack targets the first hypervisor platform, the data management system may recover virtual machines on the first hypervisor platform to one or more other hypervisor platforms, which may improve reliability. Additionally or alternatively, a customer may reduce costs and improve security by transferring backups between hypervisor platforms for storage.

It is to be understood that one or more aspects of the disclosure may be implemented in a computing environment 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
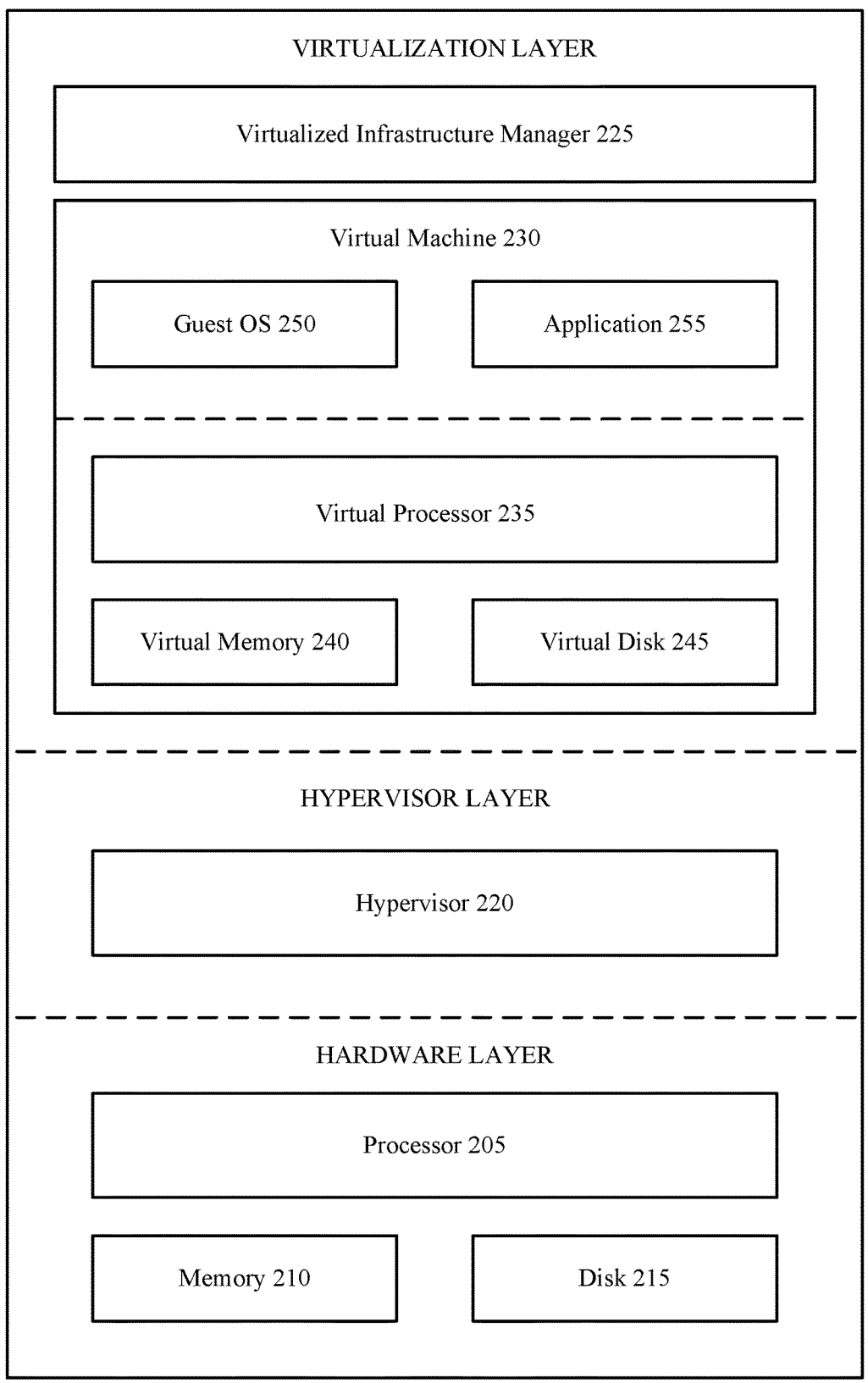
FIG. 2 illustrates an example of a server that supports snapshot-based virtual machine transfer across hypervisors in accordance with aspects of the present disclosure.

FIG. 2 illustrates an example of a server 200 that supports snapshot-based virtual machine transfer across hypervisors in accordance with aspects of the present disclosure. The server 200 may be an example of a server 125 described with reference to FIG. 1. The server 200 may include one server out of a plurality of servers that are networked together within a data center (e.g., data center 105 described with reference to FIG. 1). In one example, the plurality of servers may be positioned within one or more server racks within the data center. As depicted, the server 200 includes hardware-level components and software-level components. The hardware-level components include one or more processors 205, one or more memory 210, and one or more disks 215. The software-level components include a hypervisor 220, a virtualized infrastructure manager 225, and one or more virtual machines, such as virtual machine 230. The hypervisor 220 may include a native hypervisor or a hosted hypervisor. The hypervisor 220 may provide a virtual operating platform for running one or more virtual machines, such as virtual machine 230. Virtual machine 230 includes a plurality of virtual hardware devices including a virtual processor 235, a virtual memory 240, and a virtual disk 245. The virtual disk 245 may include a file stored within the one or more disks 245. In one example, a virtual machine 230 may include a plurality of virtual disks 245, with each virtual disk of the plurality of virtual disks 245 associated with a different file stored on the one or more disks 245. Virtual machine 230 may include a guest operating system 250 that runs one or more applications, such as application 255.

The virtualized infrastructure manager 225, which may be an example of the virtualization manager 160 described with reference to FIG. 1, may run on a virtual machine or natively on the server 200. The virtual machine may, for example, be or include the virtual machine 230 or a virtual machine separate from the server 200. Other arrangements are possible. The virtualized infrastructure manager 225 may provide a centralized platform for managing a virtualized infrastructure that includes a plurality of virtual machines. The virtualized infrastructure manager 225 may manage the provisioning of virtual machines running within the virtualized infrastructure and provide an interface to computing devices interacting with the virtualized infrastructure. The virtualized infrastructure manager 225 may perform various virtualized infrastructure related tasks, such as cloning virtual machines, creating new virtual machines, monitoring the state of virtual machines, and facilitating backups of virtual machines.

In an example, the server 200 may use the virtualized infrastructure manager 225 to facilitate backups for a plurality of virtual machines running on the server 200. One or more of the virtual machines running on the server 200 may run its own guest operating system and its own set of applications. Each virtual machine running on the server 200 may store its own set of files using one or more virtual disks associated with the virtual machine (e.g., each virtual machine may include two virtual disks that are used for storing data associated with the virtual machine).

In an example, a data management application running on a storage appliance, such as storage appliance 110 in FIG. 1, may request a snapshot of a virtual machine running on server 200. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time and a second snapshot of the virtual machine may correspond with a second state of the virtual machine at a second point in time subsequent to the first point in time.

In response to a request for a snapshot of a virtual machine at a particular point in time, the virtualized infrastructure manager 225 may set the virtual machine into a frozen state or store a copy of the virtual machine at the particular point in time. The virtualized infrastructure manager 225 may then transfer data associated with the virtual machine (e.g., an image of the virtual machine or a portion of the image of the virtual machine) to the storage appliance 110. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 225 may transfer a full image of the virtual machine to the storage appliance 110 or a plurality of data blocks corresponding with the full image (e.g., to enable a full image-level backup of the virtual machine to be stored on the storage appliance). In other cases, the virtualized infrastructure manager 225 may transfer a portion of an image of the virtual machine associated with data that has changed since an earlier point in time prior to the particular point in time or since a last snapshot of the virtual machine was taken. In one example, the virtualized infrastructure manager 225 may transfer data associated with virtual blocks stored on a virtual disk of the virtual machine that have changed since the last snapshot of the virtual machine was taken. In one example, the data management application may specify a first point in time and a second point in time and the virtualized infrastructure manager 225 may output one or more virtual data blocks associated with the virtual machine that have been modified between the first point in time and the second point in time.

In some examples, the server 200 or the hypervisor 220 may communicate with a storage appliance, such as storage appliance 110 in FIG. 1, using a distributed file system protocol such as NFS Version 3, or Server Message Block (SMB) protocol. The distributed file system protocol may allow the server 200 or the hypervisor 220 to access, read, write, or modify files stored on the storage appliance as if the files were locally stored on the server 200. The distributed file system protocol may allow the server 200 or the hypervisor 220 to mount a directory or a portion of a file system located within the storage appliance.

A data management system running on a storage appliance, such as storage appliance 110 in FIG. 1, may manage backup and restoration of enterprise data associated with the server 200, one or more other servers 200, or both. For example, the server 200 may be operable to host or manage a database for storing data, such as a data storage device 130 in FIG. 1. In some aspects, a hypervisor layer of the server 200 may be associated with a respective hypervisor platform. One or more other servers 200 may similarly manage and store enterprise data, and may be associated with the same or a different hypervisor platforms. A data management system implemented on a storage appliance may be operable to manage data stored on, executed by, or hosted by two or more other servers 200. For example, a user may grant permission for the data management system to access the user's enterprise data within multiple servers 200, where each server 200 may correspond to a respective hypervisor platform.

As described, herein, the data management system may be operable to transfer snapshots of one or more virtual machines 230 that execute on a first server 200 to a second server 200 associated with a same or different hypervisor platform. That is, the data management system may support virtual machine snapshot restoration across hypervisor platforms. By transferring a snapshot of a virtual machine 230 from a first server 200 and a corresponding first hypervisor platform to a second server 200 and a corresponding second hypervisor platform, the data management system may restore the virtual machine 230 from the second hypervisor platform if, for example, the first hypervisor platform is subject to a ransomware attack, or some other issue. The data management system may transfer snapshots of virtual machines 230 periodically, in response to detecting a condition associated with a first hypervisor platform, or in response to a request from a user.

To transfer a snapshot between hypervisor platforms as described herein, the data management system may obtain the snapshot of a first virtual machine 230 running on a first hypervisor platform. The data management system may extract data and metadata from the snapshot, convert a format of the data and metadata from a first format supported by the first hypervisor platform to a second format that is supported by the second hypervisor platform, and transfer the data and the metadata to a second virtual machine 230 running on a second hypervisor platform. In some aspects, the data management system may instruct the second hypervisor platform to create a new virtual machine 230 based on a configuration of the first virtual machine 230. The data management system may export the data and the metadata to the new virtual machine 230. Alternatively, the data management system may mount the data and the metadata to the new virtual machine 230 (e.g., a live mount). In some aspects, the data management system may mount the data and metadata to an existing virtual machine 230 executing on the second hypervisor platform (e.g., instant recovery). The described techniques may thereby provide for a virtual machine executing on a first hypervisor platform to be recovered from a snapshot transferred to a second hypervisor platform, which may improve reliability.

Figure 3:
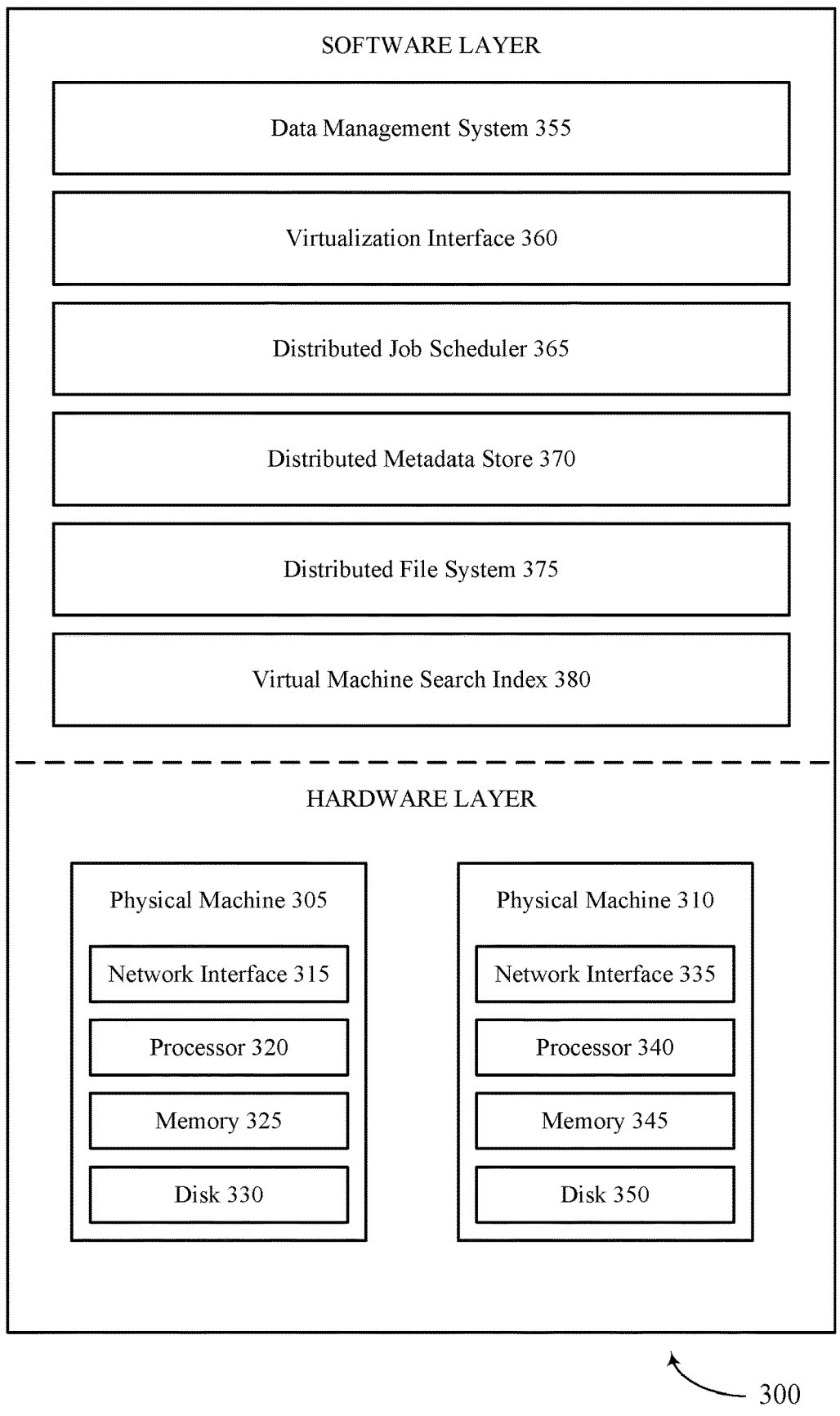
FIG. 3 illustrates an example of a storage appliance that supports snapshot-based virtual machine transfer across hypervisors in accordance with aspects of the present disclosure.

FIG. 3 illustrates an example of a storage appliance 300 that supports snapshot-based virtual machine transfer across hypervisors in accordance with aspects of the present disclosure. The storage appliance 300 may be an example of a storage appliance 110 as described with reference to FIG. 1. The storage appliance 300 may include a plurality of physical machines that may be grouped together and presented as a single computing system. One or more of the physical machines of the plurality of physical machines may comprise a node in a cluster. A cluster may be configured as a failover cluster for performing one or more failover operations as described herein. In one example, the storage appliance 300 may be positioned within a server rack within a data center, such as data center 105 as described with reference to FIG. 1. As depicted, the storage appliance 300 includes hardware-level components and software-level components. The hardware-level components include one or more physical machines, such as physical machine 305 and physical machine 310. The physical machine 305 includes a network interface 315, processor 320, memory 325, and disk 330 all in communication with each other. Processor 320 allows physical machine 305 to execute computer readable instructions stored in memory 325 to perform processes described herein. Disk 330 may include a hard disk drive and/or a solid-state drive. The physical machine 310 may include a network interface 335, processor 340, memory 345, and disk 350 all in communication with each other. Processor 340 allows physical machine 310 to execute computer readable instructions stored in memory 345 to perform processes described herein. Disk 350 may include a hard disk drive and/or a solid-state drive. In some examples, disk 350 may include a flash-based SSD or a hybrid HDD/SSD drive. In one example, the storage appliance 300 may include a plurality of physical machines arranged in a cluster. One or more of the plurality of physical machines may include a plurality of multi-core CPUs, RAM (e.g., 108 GB of RAM), SSD space (e.g., a 500 GB SSD), HDD space (e.g., four 4 TB HDDs), and a network interface controller.

In some examples, the plurality of physical machines may be used to implement a cluster-based network fileserver. The cluster-based network file server may neither require nor use a front-end load balancer. One issue with using a front-end load balancer to host the IP address for the cluster-based network file server and to forward requests to the nodes of the cluster-based network file server is that the front-end load balancer comprises a single point of failure for the cluster-based network file server. In some cases, the file system protocol used by a server, such as server 125 in FIG. 1, or a hypervisor, such as hypervisor 220 in FIG. 2, to communicate with the storage appliance 110 may not provide a failover mechanism (e.g., NFS Version 3). In the case that no failover mechanism is provided on the client side, the hypervisor may not be able to connect to a new node within a cluster in the event that the node connected to the hypervisor fails.

In some examples, each node in a cluster may be connected to each other via a network and may be associated with one or more IP addresses (e.g., two different IP addresses may be assigned to each node). In one example, each node in the cluster may be assigned a permanent IP address and a floating IP address and may be accessed using either the permanent IP address or the floating IP address. In this case, a hypervisor, such as hypervisor 220 in FIG. 2, may be configured with a first floating IP address associated with a first node in the cluster. The hypervisor may connect to the cluster using the first floating IP address. In one example, the hypervisor may communicate with the cluster using a distributed file system protocol (e.g., NFS Version 3 protocol). One or more nodes in the cluster may run a Virtual Router Redundancy Protocol (VRRP) daemon. A daemon may include a background process. Each VRRP daemon may include a list of all floating IP addresses available within the cluster. In the event that the first node associated with the first floating IP address fails, one of the VRRP daemons may automatically assume or pick up the first floating IP address if no other VRRP daemon has already assumed the first floating IP address. Therefore, if the first node in the cluster fails or otherwise goes down, then one of the remaining VRRP daemons running on the other nodes in the cluster may assume the first floating IP address that is used by the hypervisor for communicating with the cluster.

In order to determine which of the other nodes in the cluster will assume the first floating IP address, a VRRP priority may be established. In one example, given a number (N) of nodes in a cluster from node(0) to node(N−1), for a floating IP address (i), the VRRP priority of node G may be G-i modulo N. In another example, given a number (N) of nodes in a cluster from node(0) to node(N−1), for a floating IP address (i), the VRRP priority of node G may be (i-j) modulo N. In these cases, node G will assume floating IP address (i) if its VRRP priority is higher than that of any other node in the cluster that is alive and announcing itself on the network. Thus, if a node fails, then there may be a clear priority ordering for determining which other node in the cluster will take over the failed node's floating IP address.

In some examples, a cluster may include a plurality of nodes and one or more nodes of the plurality of nodes may be assigned a different floating IP address. In such examples, a first hypervisor may be configured with a first floating IP address associated with a first node in the cluster, a second hypervisor may be configured with a second floating IP address associated with a second node in the cluster, and a third hypervisor may be configured with a third floating IP address associated with a third node in the cluster.

As depicted in FIG. 3, the software-level components of the storage appliance 300 may include data management system 355, a virtualization interface 360, a distributed job scheduler 365, a distributed metadata store 370, a distributed file system 375, and one or more virtual machine search indexes, such as virtual machine search index 380. In one example, the software-level components of the storage appliance 300 may be run using a dedicated hardware-based appliance. Additionally or alternatively, the software-level components of the storage appliance 300 may be run from the cloud (e.g., the software-level components may be installed on a cloud service provider).

In some examples, the data storage across a plurality of nodes in a cluster may be aggregated and made available over a single file system namespace (e.g., /snapshots/). For example, the data storage available from the one or more physical machines (e.g., physical machine 305 and physical machine 310) may be made available of a single file system namespace. A directory for each virtual machine protected using the storage appliance 300 may be created (e.g., the directory for Virtual Machine A may be /snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in /snapshots/VM_A/s1/ and a second snapshot of Virtual Machine A may reside in /snapshots/VM_A/s2/).

The distributed file system 375 may present itself as a single file system, so that as new physical machines or nodes are added to the storage appliance 300, the cluster may automatically discover the additional nodes and automatically increase the available capacity of the file system for storing files and other data. Each file stored in the distributed file system 375 may be partitioned into one or more chunks or shards. Each of the one or more chunks may be stored within the distributed file system 375 as a separate file. The files stored within the distributed file system 375 may be replicated or mirrored over a plurality of physical machines, thereby creating a load-balanced and fault tolerant distributed file system. In one example, storage appliance 300 may include ten physical machines arranged as a failover cluster and a first file corresponding with a snapshot of a virtual machine (e.g., /snapshots/VM_A/sUs1.full) may be replicated and stored on three of the ten machines.

The distributed metadata store 370 may include a distributed database management system that provides high availability without a single point of failure. In one example, the distributed metadata store 370 may comprise a database, such as a distributed document-oriented database. The distributed metadata store 370 may be used as a distributed key value storage system. In one example, the distributed metadata store 370 may include a distributed non-structured query language (NoSQL) key value store database. In some examples, the distributed metadata store 370 may include a partitioned row store, in which rows are organized into tables or other collections of related data held within a structured format within the key value store database. A table (or a set of tables) may be used to store metadata information associated with one or more files stored within the distributed file system 375. The metadata information may include the name of a file, a size of the file, file permissions associated with the file, when the file was last modified, and file mapping information associated with an identification of the location of the file stored within a cluster of physical machines. In one example, a new file corresponding with a snapshot of a virtual machine may be stored within the distributed file system 375 and metadata associated with the new file may be stored within the distributed metadata store 370. The distributed metadata store 370 may also be used to store a backup schedule for the virtual machine and a list of snapshots for the virtual machine that are stored using the storage appliance 300.

In some examples, the distributed metadata store 370 may be used to manage one or more versions of a virtual machine. Each version of the virtual machine may correspond with a full image snapshot of the virtual machine stored within the distributed file system 375 or an incremental snapshot of the virtual machine (e.g., a forward incremental or reverse incremental) stored within the distributed file system 375. In one example, the one or more versions of the virtual machine may correspond with a plurality of files. The plurality of files may include a single full image snapshot of the virtual machine and one or more incremental aspects derived from the single full image snapshot. The single full image snapshot of the virtual machine may be stored using a first storage device of a first type (e.g., a HDD) and the one or more incremental aspects derived from the single full image snapshot may be stored using a second storage device of a second type (e.g., an SSD). In this example, a single full image needs to be stored and each version of the virtual machine may be generated from the single full image or the single full image combined with a subset of the one or more incremental aspects. Further, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incremental aspects.

The distributed job scheduler 365 may be used for scheduling backup jobs that acquire and store virtual machine snapshots for one or more virtual machines over time. The distributed job scheduler 365 may follow a backup schedule to back up an entire image of a virtual machine at a particular point in time or one or more virtual disks associated with the virtual machine at the particular point in time. In one example, the backup schedule may specify that the virtual machine be backed up at a snapshot capture frequency, such as every two hours or every 24 hours. A backup job may be associated with one or more tasks to be performed in a sequence. One or more tasks associated with a job may be run on a particular node within a cluster. In some cases, the distributed job scheduler 365 may schedule a specific job to be run on a particular node based on data stored on the particular node. For example, the distributed job scheduler 365 may schedule a virtual machine snapshot job to be run on a node in a cluster that is used to store snapshots of the virtual machine in order to reduce network congestion.

The distributed job scheduler 365 may comprise a distributed fault tolerant job scheduler, in which jobs affected by node failures are recovered and rescheduled to be run on available nodes. In one example, the distributed job scheduler 365 may be fully decentralized and implemented without the existence of a master node. The distributed job scheduler 365 may run job scheduling processes on each node in a cluster or on a plurality of nodes in the cluster. In one example, the distributed job scheduler 365 may run a first set of job scheduling processes on a first node in the cluster, a second set of job scheduling processes on a second node in the cluster, and a third set of job scheduling processes on a third node in the cluster. The first set of job scheduling processes, the second set of job scheduling processes, and the third set of job scheduling processes may store information regarding jobs, schedules, and the states of jobs using a metadata store, such as distributed metadata store 370. In the event that the first node running the first set of job scheduling processes fails (e.g., due to a network failure or a physical machine failure), the states of the jobs managed by the first set of job scheduling processes may fail to be updated within a threshold period of time (e.g., a job may fail to be completed within 30 seconds or within minutes from being started). In response to detecting jobs that have failed to be updated within the threshold period of time, the distributed job scheduler 365 may undo and restart the failed jobs on available nodes within the cluster.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one example, the job scheduling processes may detect that a particular task for a particular job has failed and in response may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The distributed job scheduler 365 may manage a job in which a series of tasks associated with the job are to be performed atomically (i.e., partial execution of the series of tasks is not permitted). If the series of tasks cannot be completely executed or there is any failure that occurs to one of the series of tasks during execution (e.g., a hard disk associated with a physical machine fails or a network connection to the physical machine fails), then the state of a data management system may be returned to a state as if none of the series of tasks were ever performed. The series of tasks may correspond with an ordering of tasks for the series of tasks and the distributed job scheduler 365 may ensure that each task of the series of tasks is executed based on the ordering of tasks. Tasks that do not have dependencies with each other may be executed in parallel.

In some examples, the distributed job scheduler 365 may schedule each task of a series of tasks to be performed on a specific node in a cluster. In some examples, the distributed job scheduler 365 may schedule a first task of the series of tasks to be performed on a first node in a cluster and a second task of the series of tasks to be performed on a second node in the cluster. In these examples, the first task may have to operate on a first set of data (e.g., a first file stored in a file system) stored on the first node and the second task may have to operate on a second set of data (e.g., metadata related to the first file that is stored in a database) stored on the second node. In some examples, one or more tasks associated with a job may have an affinity to a specific node in a cluster.

In one example, if the one or more tasks require access to a database that has been replicated on three nodes in a cluster, then the one or more tasks may be executed on one of the three nodes. In another example, if the one or more tasks require access to multiple chunks of data associated with a virtual disk that has been replicated over four nodes in a cluster, then the one or more tasks may be executed on one of the four nodes. Thus, the distributed job scheduler 365 may assign one or more tasks associated with a job to be executed on a particular node in a cluster based on the location of data required to be accessed by the one or more tasks.

In one example, the distributed job scheduler 365 may manage a first job associated with capturing and storing a snapshot of a virtual machine periodically (e.g., every 30 minutes). The first job may include one or more tasks, such as communicating with a virtualized infrastructure manager, such as the virtualized infrastructure manager 225 in FIG. 2, to create a frozen copy of the virtual machine and to transfer one or more chunks (or one or more files) associated with the frozen copy to a storage appliance, such as storage appliance 110 in FIG. 1. The one or more tasks may also include generating metadata for the one or more chunks, storing the metadata using the distributed metadata store 370, storing the one or more chunks within the distributed file system 375, and communicating with the virtualized infrastructure manager 225 that the frozen copy of the virtual machine may be unfrozen or released from a frozen state. The metadata for a first chunk of the one or more chunks may include information specifying a version of the virtual machine associated with the frozen copy, a time associated with the version (e.g., the snapshot of the virtual machine was taken at 5:30 p.m. on Jun. 29, 2018), and a file path to where the first chunk is stored within the distributed file system 375 (e.g., the first chunk is located at /snapshotsNM_B/s1/s1.chunk1). The one or more tasks may also include deduplication, compression (e.g., using a lossless data compression algorithm such as LZ4 or LZ77), decompression, encryption (e.g., using a symmetric key algorithm such as Triple DES or AES-256), and decryption related tasks.

The virtualization interface 360 may provide an interface for communicating with a virtualized infrastructure manager managing a virtualization infrastructure, such as virtualized infrastructure manager 225 in FIG. 2, and requesting data associated with virtual machine snapshots from the virtualization infrastructure. The virtualization interface 360 may communicate with the virtualized infrastructure manager using an API for accessing the virtualized infrastructure manager (e.g., to communicate a request for a snapshot of a virtual machine). In this case, storage appliance 300 may request and receive data from a virtualized infrastructure without requiring agent software to be installed or running on virtual machines within the virtualized infrastructure.

The virtualization interface 360 may request data associated with virtual blocks stored on a virtual disk of the virtual machine that have changed since a last snapshot of the virtual machine was taken or since a specified prior point in time. Therefore, in some cases, if a snapshot of a virtual machine is the first snapshot taken of the virtual machine, then a full image of the virtual machine may be transferred to the storage appliance 300. However, if the snapshot of the virtual machine is not the first snapshot taken of the virtual machine, then the data blocks of the virtual machine that have changed since a prior snapshot was taken may be transferred to the storage appliance 300.

The virtual machine search index 380 may include a list of files that have been stored using a virtual machine and a version history for each of the files in the list. One or more version of a file may be mapped to the earliest point-in-time snapshot of the virtual machine that includes the version of the file or to a snapshot of the virtual machine that includes the version of the file (e.g., the latest point in time snapshot of the virtual machine that includes the version of the file). In one example, the virtual machine search index 380 may be used to identify a version of the virtual machine that includes a particular version of a file (e.g., a particular version of a database, a spreadsheet, or a word processing document). In some cases, each of the virtual machines that are backed up or protected using storage appliance 300 may have a corresponding virtual machine search index.

In one example, as each snapshot of a virtual machine is ingested, each virtual disk associated with the virtual machine is parsed in order to identify a file system type associated with the virtual disk and to extract metadata (e.g., file system metadata) for each file stored on the virtual disk. The metadata may include information for locating and retrieving each file from the virtual disk. The metadata may also include a name of a file, the size of the file, the last time at which the file was modified, and a content checksum for the file. Each file that has been added, deleted, or modified since a previous snapshot was captured may be determined using the metadata (e.g., by comparing the time at which a file was last modified with a time associated with the previous snapshot). Thus, for every file that has existed within any of the snapshots of the virtual machine, a virtual machine search index (e.g., virtual machine search index 380) may be used to identify when the file was first created (e.g., corresponding with a first version of the file) and at what times the file was modified (e.g., corresponding with subsequent versions of the file). Each version of the file may be mapped to a particular version of the virtual machine that stores that version of the file.

In some examples, if a virtual machine includes a plurality of virtual disks, then a virtual machine search index may be generated for each virtual disk of the plurality of virtual disks. For example, a first virtual machine search index may catalog, and map files located on a first virtual disk of the plurality of virtual disks and a second virtual machine search index may catalog and map files located on a second virtual disk of the plurality of virtual disks. In this case, a global file catalog or a global virtual machine search index for the virtual machine may include the first virtual machine search index and the second virtual machine search index. A global file catalog may be stored for each virtual machine backed up by a storage appliance within a file system, such as distributed file system 375 in FIG. 3.

The data management system 355 may comprise an application running on the storage appliance 300 that manages and stores one or more snapshots of a virtual machine. In one example, the data management system 355 may comprise a highest-level layer in an integrated software stack running on the storage appliance. The integrated software stack may include the data management system 355, the virtualization interface 360, the distributed job scheduler 365, the distributed metadata store 370, and the distributed file system 375.

In some examples, the integrated software stack may run on other computing devices, such as a server or computing device 115 in FIG. 1. The data management system 355 may use the virtualization interface 360, the distributed job scheduler 365, the distributed metadata store 370, and the distributed file system 375 to manage and store one or more snapshots of a virtual machine. One or more snapshots of the virtual machine may correspond with a point-in-time version of the virtual machine. The data management system 355 may generate and manage a list of versions for the virtual machine. One or more versions of the virtual machine may map to or reference one or more chunks and/or one or more files stored within the distributed file system 375. Combined together, the one or more chunks and/or the one or more files stored within the distributed file system 375 may comprise a full image of the version of the virtual machine.

As described herein, the storage appliance 300 or server 200 may support virtual machine snapshot restoration across different hypervisor platforms. In some aspects, the data management system 355 running on the storage appliance 300 may manage data stored across one or more servers 200 and corresponding hypervisor platforms, as described with reference to FIGS. 1 and 2. The data management system 355 may be operable to transfer snapshots of one or more virtual machines that execute on a first server to a second server associated with a same or different hypervisor platform. That is, the data management system 355 may support virtual machine snapshot restoration cross hypervisor platforms. By transferring a snapshot of a virtual machine from a first server and a corresponding first hypervisor platform to a second server and a corresponding second hypervisor platform, the data management system 355 may restore the virtual machine from the second hypervisor platform if, for example, the first hypervisor platform is subject to a ransomware attack, or some other issue. The data management system 355 may transfer snapshots of virtual machines periodically, in response to detecting a condition associated with a first hypervisor platform, or in response to a request from a user.

To transfer a snapshot between hypervisor platforms as described herein, the data management system 355 may obtain the snapshot of a first virtual machine running on a first hypervisor platform. In some aspects, the snapshot may be temporarily or permanently stored in a memory of the storage appliance 300. The data management system 355 may extract data and metadata from the snapshot, convert a format of the data and metadata from a first format supported by the first hypervisor platform to a second format that is supported by the second hypervisor platform, and transfer the data and the metadata to a second virtual machine running on a second hypervisor platform. In some aspects, the data management system 355 may instruct the second hypervisor platform to create a new virtual machine based on a configuration of the first virtual machine. The data management system 355 may export the data and the metadata to the new virtual machine. Alternatively, the data management system 355 may mount the data and the metadata to the new virtual machine (e.g., a live mount). In some aspects, the data management system 355 may mount the data and metadata to an existing virtual machine executing on the second hypervisor platform (e.g., instant recovery). The described techniques may thereby provide for a virtual machine executing on a first hypervisor platform to be recovered from a snapshot transferred to a second hypervisor platform, which may improve reliability.

Figure 4:
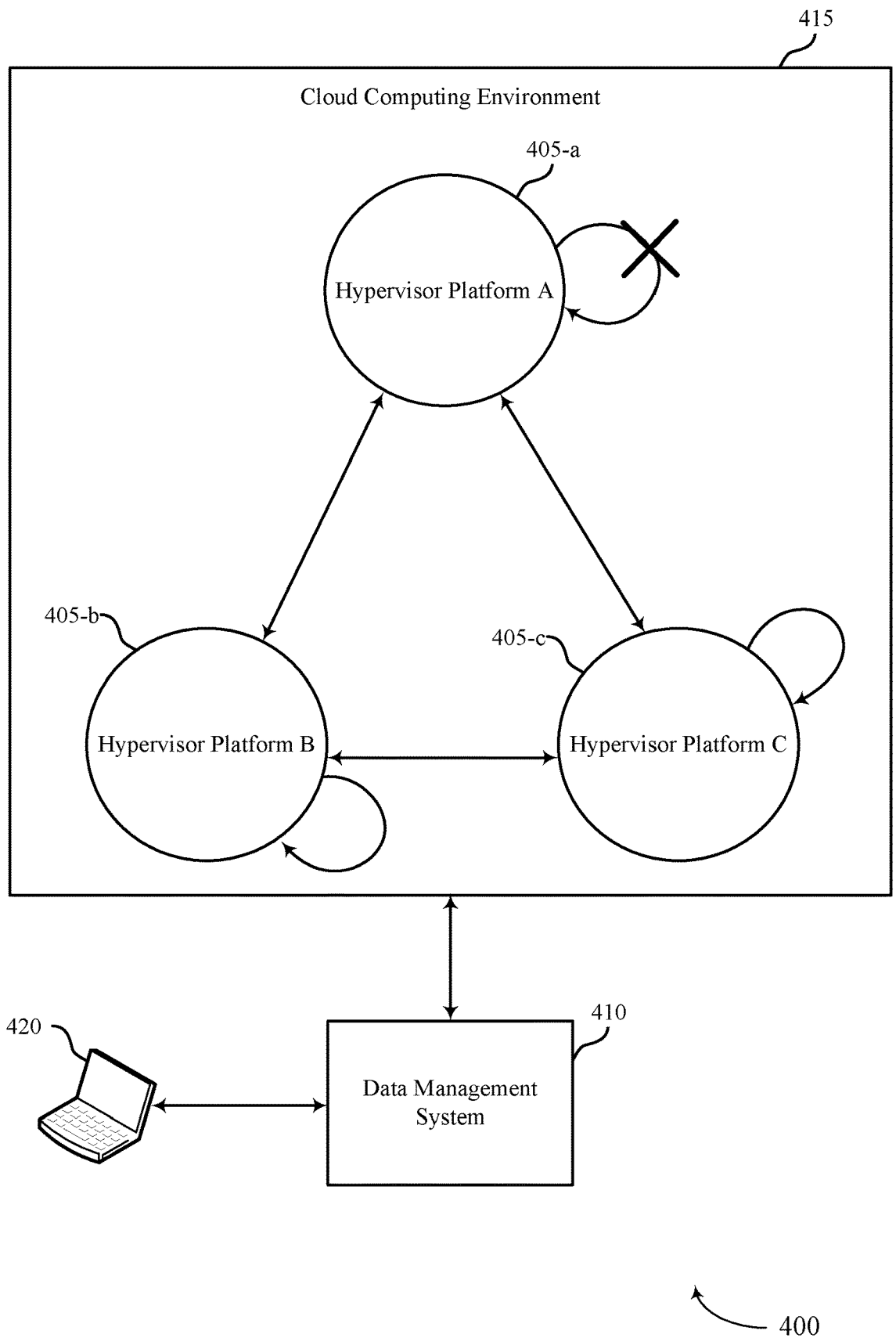
FIG. 4 illustrates an example of a hypervisor platform architecture that supports snapshot-based virtual machine transfer across hypervisors in accordance with aspects of the present disclosure.

FIG. 4 illustrates an example of a hypervisor platform architecture 400 that supports snapshot-based virtual machine transfer across hypervisors in accordance with aspects of the present disclosure. In some aspects, the hypervisor platform architecture 400 illustrates an example architecture of components that support transfer of backups between hypervisor platforms 405 as described herein. The hypervisor platform architecture 400 includes a data management system 410, which may represent an example of a data management system 355 as described with reference to FIGS. 1 through 3. The hypervisor platform architecture 400 further includes a first hypervisor platform 405-*a*, a second hypervisor platform 405-*b*, and a third hypervisor platform 405-*c*, which may represent examples of virtual operating platforms provided by respective hypervisors 220 as described with respect to FIGS. 1 through 3. The data management system 410 may include or be in communication with a user interface 420, which may be accessed by a client or user to request transfer of backups between hypervisor platforms 405.

The hypervisor platform architecture 400 represents an example architecture of hypervisor platforms that may be used by one or more clients or customers for data storage, backup, and restoration. Each of the hypervisor platforms 405-*a*, 405-*b*, and 405-*c* may represent an example of a virtual operating platform associated with a respective hypervisor that provides data backup and restoration services to one or more customers. For example, a hypervisor platform 405 may enable sharing or distribution of physical compute and memory resources for multiple customers across one or more virtual machines of a server or other database, as described with reference to FIGS. 1-3. The hypervisor platforms 405-*a*, 405-*b*, and 405-*c* may be associated with a same or different hypervisor vendor (e.g., VMware, Hyper-V, Nutanix, etc.).

The data management system 410 may be a computing system employed to manage, process, backup, and restore data using a network of one or more computing devices. In the example of FIG. 4, the data management system 410 may be employed by a user to manage backup and restoration of data and other computing resources of the user that are stored within one or more hypervisor platforms 405. That is, the data management system 410 may be configured to connect with and manage one or more hypervisor platforms 405. The data management system 410 may provide a customer with centralized data management across multiple distributed data centers, servers, hypervisor platforms, and/or cloud environments. For example, the data management system 410 may be operable to access and manage the hypervisor platform 405-*a*, the hypervisor platform 405-*b*, the hypervisor platform 405-*c*, and one or more other hypervisor platforms 405 via a cloud computing environment 415, which may represent an example of a cloud computing environment 185 as described with reference to FIGS. 1-3. The data management system 410 may create and store a unified system of record for information and enterprise applications running across the distributed hypervisor platforms.

Although a cloud computing environment 415 is shown, it is to be understood that the data management system 410 may connect with the hypervisor platforms 405 via any computing network connection. For example, one or more of the hypervisor platforms 405 may be on-premise hypervisor platforms 405 that execute on a server or other database of a user (e.g., on-premise at a university or other enterprise). Additionally or alternatively, the hypervisor platforms 405 may be cloud-based hypervisor platforms that execute on servers associated with cloud-based data centers.

The data management system 410 may be operable to access virtual machines that execute in each of the hypervisor platforms 405-*a*, 405-*b*, and 405-*c*. The virtual machines may represent examples of virtual machines 230 as described with reference to FIGS. 1-3. For example, the data management system 410 may obtain backups of virtual machines that execute across one or more servers within each hypervisor platform 405. The data management system 410 may obtain and store snapshots of one or more of the virtual machines.

The data management system 410 may, in some aspects, obtain and ingest the virtual machine snapshots or backups. For example, the data management system 410 may execute on a storage appliance, such as the storage appliance 110 as described with reference to FIG. 1. The storage appliance may include hardware for data storage, and the data management system 410 may store backups of different hypervisor platforms in one or more disks of the storage appliance. In some aspects, the storage appliance may run in the customer's environment. Additionally or alternatively, the data management system 410 may store the backups of the virtual machines in a different data storage cluster or a storage location of a cloud environment, such as the cloud environment 415. The data management system 410 may thereby store or archive the backups in a location that is known to and accessible by the data management system 410. The data management system 410 may retrieve the archived backups at any given time.

The data management system 410 may restore a virtual machine to a hypervisor platform 405 using a stored backup of the virtual machine. For example, the data management system 410 may obtain a snapshot of a state of a first virtual machine executing on the first hypervisor platform 405-*a* at a first point in time. The data management system 410 may subsequently recover the first virtual machine to the hypervisor platform 405-*a* using the stored snapshot. For example, the data management system 410 may restore the snapshot to the first hypervisor platform 405-*a*, and the state of the first virtual machine at the first point in time may be recovered.

However, if the hypervisor platform 405-*a*, the first virtual machine, or both become unavailable, unresponsive, or lose connection for a time period, the first virtual machine may not be recoverable. For example, if the hypervisor platform 405-*a* is subject to a ransomware attack, or some other corruption or problem occurs within the hypervisor platform 405-*a* (e.g., a disaster recovery condition of the hypervisor platform 405-*a*), the hypervisor platform 405-*a* may be unavailable or disconnected from the network for a time period. In such cases, the data management system 410 may not recover the first virtual machine to the hypervisor platform 405-*a* for at least the time period, which may introduce delays and may reduce reliability of the data backups provided by the data management system 410. Additionally or alternatively, the data management system 410 may export an on-premise snapshot on the hypervisor platform 405-*a* to the cloud environment 415. However, the solutions and services provided by the hypervisor platform 405-*a* may be associated with relatively limited functionality and suitability in the cloud environment 415. In some other cases, there may be limited storage capacity and computing resources available for restoration of a previously backed up virtual machine. However, the data management system 410 may, in some cases, restrict recovery of virtual machine snapshots to a source hypervisor platform 405 or to the cloud environment 415.

Techniques described herein support transfer of backups between virtual machines executing on different hypervisor platforms 405. The data management system 410 described herein may thus be operable to recover a backup of a virtual machine obtained on a first hypervisor platform 405 to a second hypervisor platform 405. For example, the data management system 410 may obtain a snapshot of a virtual machine executing on the hypervisor platform 405-*a*. If the hypervisor platform 405-*a* subsequently loses connection or is subject to a ransomware attack, the data management system 410 may recover the obtained snapshot of the first virtual machine to a different hypervisor platform 405, such as the hypervisor platform 405-*b* or the hypervisor platform 405-*c* in FIG. 4.

In some aspects, the data management system 410 may restore a virtual machine to a different hypervisor platform based on a request from a user (e.g., a client). For example, the data management system 410 may be coupled with or in communication with the user via a user interface 420. The data management system 410 may display, through the user interface 420, a list of hypervisor platforms 405 that are available for recovery, a list of virtual machines that are available for backup or restoration, or both. In the example of FIG. 4, the data management system 410 may display a list of target hypervisor platforms 405 including the hypervisor platform 405-*b* and the hypervisor platform 405-*c* via the user interface 420, and the user may select the hypervisor platform 405-*b* from the list, which may indicate a request to restore or backup a first virtual machine on the hypervisor platform 405-*a* to the hypervisor platform 405-*b*. If the user requests to restore a virtual machine to a different hypervisor platform 405, the data management system 410 may perform the migration based on or in response to the request.

In some aspects, the user may request to restore virtual machines to different hypervisor platforms 405 to reduce costs, to provide diversity for improved security and reliability, to transfer computing resources between hypervisor platforms 405, or any combination thereof. For example, the user, the data management system 410, or both may detect an issue or problem with a hypervisor platform 405, such as a ransomware attack, an outage, a corruption, or some other issue. The issue or problem may be referred to as a disaster recovery condition for the hypervisor platform 405. In response to detecting the condition, the data management system 410 may display, via the user interface 420, options for the user. For example, the data management system 410 may display a list of other available hypervisor platforms 405 to which the user may request to restore the virtual machine. The user may thus request to restore the virtual machine to a different hypervisor platform 405 based on the issue.

In some aspects, primary instances of software and other applications for the user may run on a first hypervisor platform 405 that may be more expensive than other hypervisor platforms 405. To reduce costs, the user may request to utilize one or more cheaper hypervisor platforms as recovery sites. In such cases, the user may pay for less capacity on the first hypervisor platform 405 while maintaining backed-up or replicated copies of the virtual machines on the other hypervisor platforms 405. Additionally or alternatively, the user may refrain from purchasing additional licenses for software, hardware, and network setup to create a recovery site with sufficient capacity from a same hypervisor vendor as the hypervisor vendor associated with the first hypervisor platform 405.

Additionally or alternatively, the data management system 410 may perform the transfer automatically based on detecting a condition associated with a hypervisor platform 405 (e.g., a ransomware attack). For example, if the data management system 410 detects the condition, the data management system 410 may autonomously restore virtual machines that were previously running on the hypervisor platform 405 to a different hypervisor platform 405 without receiving a request from the user. In some aspects, the user may configure or permit the data management system 410 to perform such autonomous restoration.

To restore a first virtual machine to a different hypervisor platform 405, the data management system 410 described herein may obtain a snapshot or other backup of the first virtual machine executing on a first hypervisor platform 405, such as the hypervisor platform 405-*a*. The backup may include data and metadata in a first format that may be supported by the first hypervisor platform 405-*a*. In some aspects, the metadata may include a first type of metadata. The data management system 410 may convert the first format to a second format that may be supported by a second (target) hypervisor platform 405-*b*. In some aspects, the conversion may convert the metadata to a second type of metadata. The first and second types of metadata may share one or more fields, such as a quantity of CPUs. Additionally or alternatively, the first and second types of metadata may include one or more different fields. For example, a network type of the first hypervisor platform 405-*a* may be different than a network type of the second hypervisor platform 405-*b*. The data management system 410 may subsequently transfer the data and the metadata in the second format to the second hypervisor platform 405-*b*.

To transfer the data and the metadata, the data management system 410 may instruct the second hypervisor platform 405-*b* to create a second virtual machine. The data management system 410 may instruct the second hypervisor platform 405-*b* to create the second virtual machine according to a virtual machine configuration that is based on a virtual machine configuration of the first virtual machine. The configuration may be associated with a capacity of the virtual machines, a processing capability of the virtual machines, one or more other configuration settings associated with a configuration and deployment of resources within the virtual machines, or any combination thereof. The data management system 410 may, in some aspects, export the data and the metadata in the second format to the second virtual machine on the second hypervisor platform 405-*b*. That is, the data management system 410 may restore the data and the metadata to the second virtual machine. Additionally or alternatively, the data management system 410 may mount the data and the metadata in the second format to the second virtual machine executing on the second hypervisor platform 405-*b*. Mounting the data and the metadata may provide the second virtual machine executing on the second hypervisor platform 405-*b* with access to run and use the data and the metadata, but the data and the metadata may remain stored at or hosted by the data management system 410. That is, the data and the metadata may not be exported to the second hypervisor platform 405-*b*. The mount of the data and the metadata may be referred to as a live mount.

In some aspects, the data management system 410 may transfer the data and the metadata in the second format using an existing virtual machine on the second hypervisor platform 405-*b*. For example, the data management system 410 may identify a virtual machine executing on the second hypervisor platform 405-*b* that has a same or similar configuration as the first (source) virtual machine on the first hypervisor platform. If the data management system 410 identifies that a virtual machine with the same or similar configuration already exists on the second hypervisor platform 405-*b*, the data management system 410 may mount the data and the metadata in the second format to the existing virtual machine on the second hypervisor platform 405-*b*. The data and the metadata, once mounted to the existing virtual machine, may override data and metadata previously associated with the virtual machine. Mounting the data and the metadata to an existing virtual machine may be referred to as instant recovery.

In some aspects, after transferring the data and the metadata to the second virtual machine, the data management system 410 may receive a request to recover the first virtual machine (e.g., via the user interface 420). The data management system 410 may recover the first virtual machine from the second hypervisor platform 405-*b* using the data and the metadata transferred to the second virtual machine executing on the second hypervisor platform 405-*b*. For example, the data management system 410 may restore the first virtual machine by obtaining a backup of the second virtual machine, converting a format of the backup, and transferring the backup back to the first hypervisor platform 405-*a*, or any other hypervisor platform 405 using the described techniques.

Thus, the data management system 410 described herein may provide for a snapshot of a first virtual machine that executes on a first hypervisor platform 405 to be restored to one or more other hypervisor platforms 405, which may improve reliability and reduce costs, among other benefits. Techniques for recovering a virtual machine across hypervisor platforms 405 are described in further detail elsewhere herein, including with reference to FIGS. 5 and 6.

Figure 5:
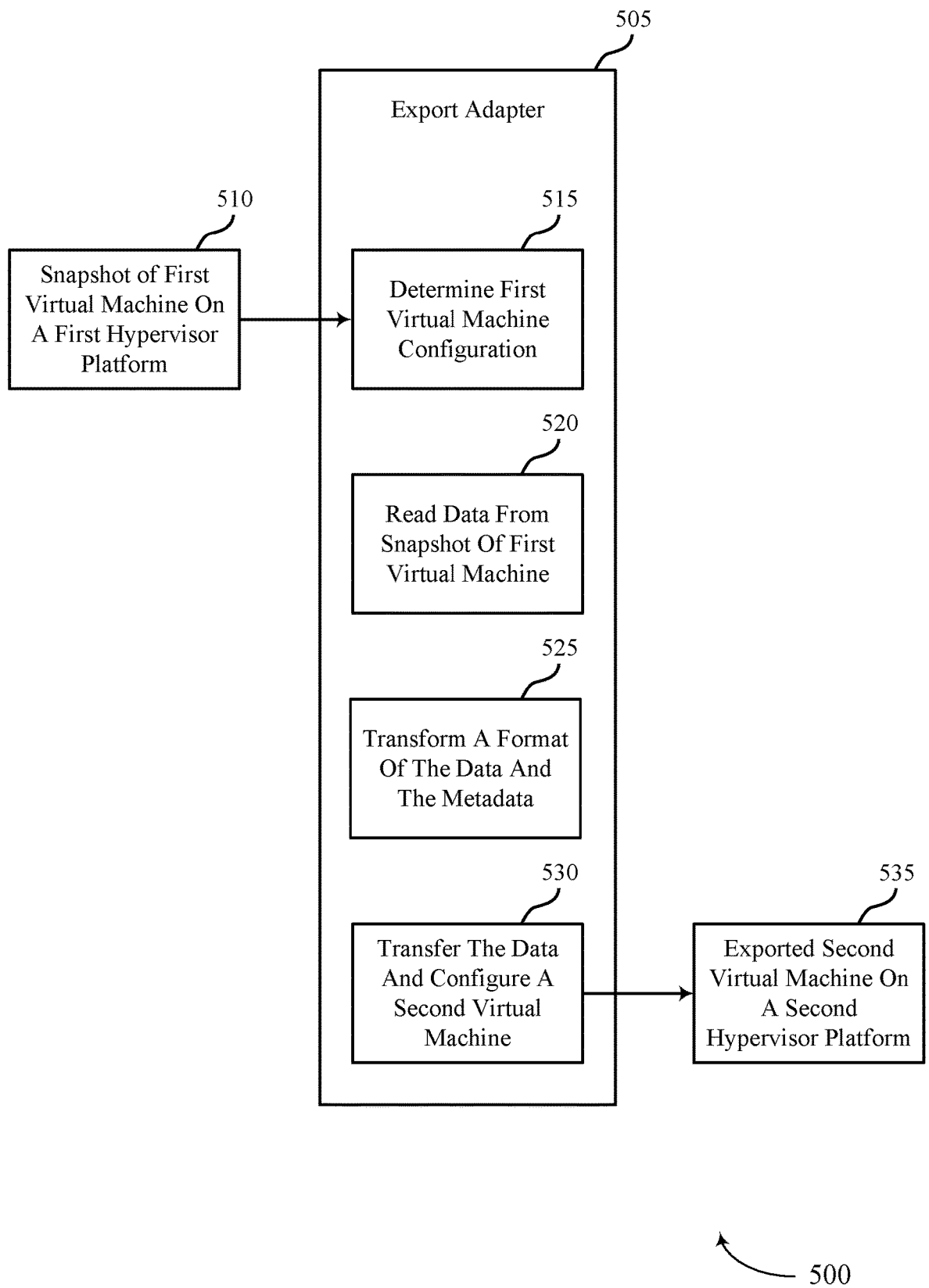
FIG. 5 illustrates an example of a snapshot export adaption process that supports snapshot-based virtual machine transfer across hypervisors in accordance with aspects of the present disclosure.

FIG. 5 illustrates an example of a snapshot export adaption process 500 that supports snapshot-based virtual machine transfer across hypervisors in accordance with aspects of the present disclosure. The snapshot export adaption process 500 may implement or be implemented by aspects of the hypervisor platform architecture 400 described with reference to FIG. 4. For example, the snapshot export adaption process 500 illustrates operations performed by an export adapter 505 to restore a virtual machine to a different hypervisor platform. The hypervisor platform may represent an example of a hypervisor platform 405 described with reference to FIG. 4. The export adaptor 505 may represent an example of a component, logic, circuitry, or software within a data management system, such as the data management system 410 described with reference to FIG. 4. As described with reference to FIGS. 1-4, a data management system may restore a snapshot of a first virtual machine that executes on a first hypervisor platform to a second virtual machine that executes on a second hypervisor platform. The export adaptor 505 may be operable to adapt a format of the virtual machine backup to be compatible with one or more different hypervisor platforms, which may support the virtual machine restoration across hypervisor platforms described herein.

At 510, the export adapter 505 may obtain the snapshot of the first virtual machine on the first hypervisor platform. The snapshot may include data and metadata in a first format that may be supported by the first hypervisor platform. The export adapter 505 may store the snapshot within the data management system (e.g., a data management system cluster on the client's environment) or within another storage location on a cloud environment.

At 515, the export adapter 505 may determine a first virtual machine configuration associated with the first virtual machine. The export adapter 505 may extract metadata from the snapshot of the first virtual machine, and the metadata may be indicative of the first virtual machine configuration. In some aspects, the first virtual machine configuration may be unique to the first hypervisor platform. For example, one or more fields in the metadata, a type of the metadata, or one or more other metadata configurations may be proprietary to the first hypervisor platform or a hypervisor vendor that sells the first hypervisor platform. Additionally or alternatively, some aspects of the first virtual machine configuration may be common to one or more other hypervisor platforms. The configuration may be associated with a capacity of the first virtual machine, a processing capability of the first virtual machine, one or more other configuration settings associated with a configuration and deployment of resources within the first virtual machine, or any combination thereof.

At 520, the export adapter 505 may read or extract data from the snapshot of the first virtual machine. To read the data, the export adapter 505 may retrieve the data associated with the snapshot that is stored within the data management system or the cloud location. In some aspects, the export adapter 505 may extract the metadata and the data at the same time, or the export adapter 505 may extract the data before extracting the metadata.

At 525, the export adapter 505 may transform a format of the data and the metadata associated with the snapshot. For example, the export adapter 505 may convert a format of the data and the metadata from the first format that is supported by the first hypervisor platform to a second format that is supported by the second hypervisor platform. The first and second formats may be different based on different configuration settings of each hypervisor platform. In some aspects, a hypervisor vendor may provide rules, tools, or resources for converting a virtual machine to a host format of the hypervisor vendor. Thus, the export adaptor 505 may utilize the tools provided by the second hypervisor vendor to convert the first format to the second format.

At 530, the export adapter 505 may transfer the data and configure a second virtual machine on the second hypervisor platform. In some aspects, the export adapter 505 may configure the second virtual machine before or after transferring the data, or the export adapter 505 may perform the data transfer and the virtual machine configuration at the same time. To configure the second virtual machine, the export adapter 505 may, in some aspects, send instructions to the second hypervisor platform to create the second virtual machine. The instructions may indicate one or more configuration settings associated with a virtual machine configuration for the second virtual machine. The configuration settings may be based on the configuration settings associated with the first virtual machine on the first hypervisor platform that is being restored, and may be adapted to be compatible with the second hypervisor platform. In some aspects, one or more of the configuration settings may be input by the user.

Additionally or alternatively, the export adapter 505 may identify an existing virtual machine associated with the one or more configuration settings. That is, the export adapter 505 may identify a virtual machine that currently executes on the second hypervisor platform and that is compatible with the data and the metadata to be restored. In such cases, the export adapter 505 may utilize the existing virtual machine as the second virtual machine (e.g., the export adapter 505 may refrain from instructing the second hypervisor platform to create the second virtual machine).

To transfer the data and the metadata, at 535, the export adapter 505 may export the data and the metadata in the second format to the second virtual machine on the second hypervisor platform. That is, the export adapter 505 may restore the data and the metadata to the second virtual machine. Additionally or alternatively, at 535, the export adapter 505 may mount the data and the metadata in the second format to the second virtual machine executing on the second hypervisor platform. If the export adapter 505 instructs the second hypervisor platform to create the second virtual machine, the mount of the data and the metadata may be referred to as a live mount. If the export adapter 505 identifies an existing virtual machine (e.g., a new virtual machine is not created on the second hypervisor platform), the mount of the data and the metadata to the existing virtual machine may be referred to as instant recovery. The data and the metadata, once mounted to the second hypervisor platform, may be available to the second virtual machine, but the data and the metadata may remain stored and hosted by the data management system.

In some aspects, the if the export adapter 505 mounts the data and the metadata to the second virtual machine, the export adapter 505 may subsequently restore the data and the metadata to the second virtual machine. For example, the data and the metadata may be mounted to the second virtual machine for a threshold time period after the mount. After an expiration of the threshold time period, the data and the metadata may be exported from the data management system and restored to the second virtual machine.

The export adapter 505 may thereby support transformation of a backup of a virtual machine on a first hypervisor platform to be compatible with one or more other hypervisor platforms. The described techniques may improve reliability and efficiency of data backup and restoration.

Figure 6:
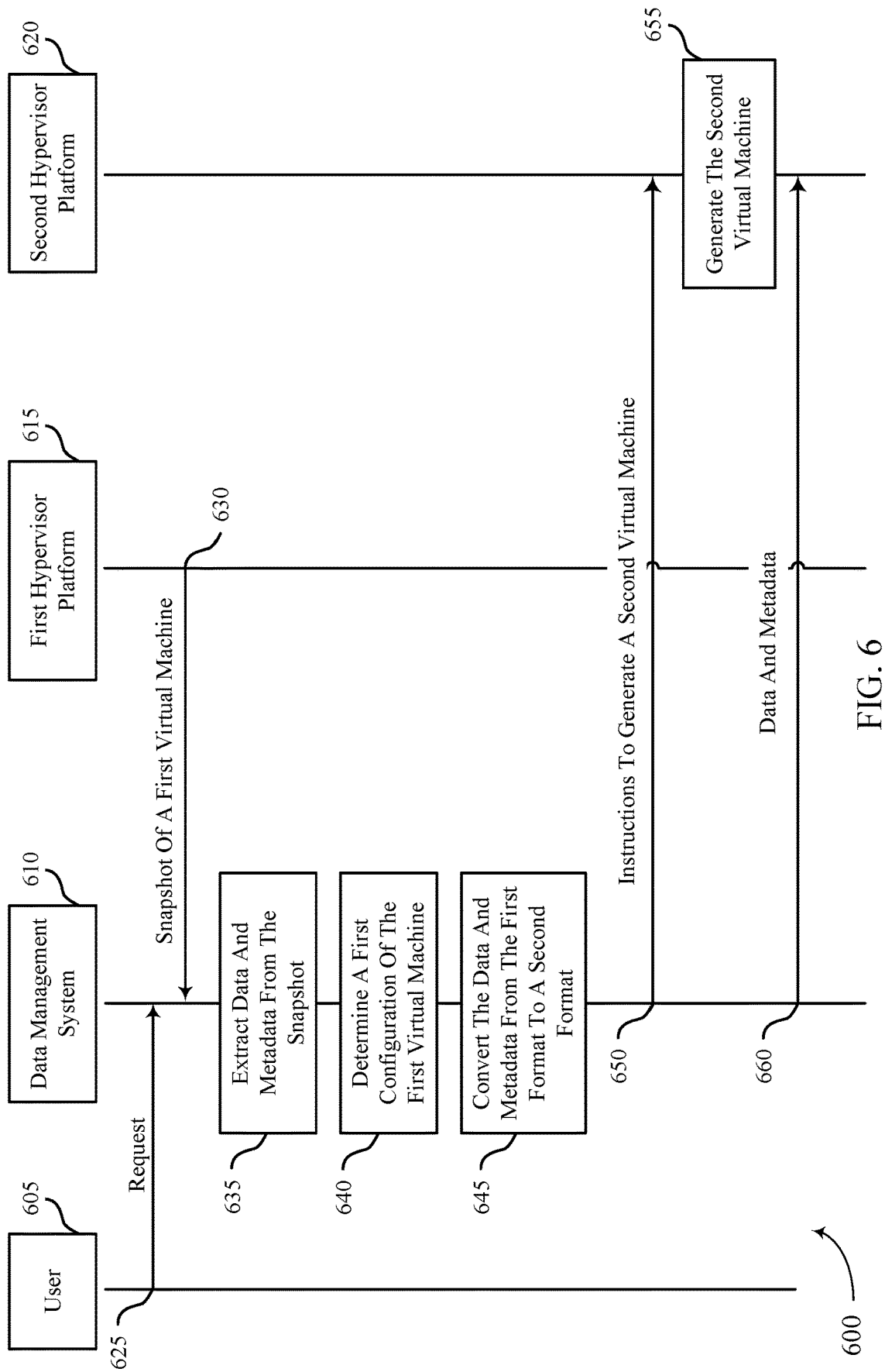
FIG. 6 illustrates an example of a process flow that supports snapshot-based virtual machine transfer across hypervisors in accordance with aspects of the present disclosure.

FIG. 6 illustrates an example of a process flow 600 that supports snapshot-based virtual machine transfer across hypervisors in accordance with aspects of the present disclosure. The process flow 600 may implement or be implemented by aspects of the hypervisor platform architecture 400 and the backup export adaption process described with reference to FIGS. 4 and 5. For example, the process flow 600 may be implemented by a user 605, a data management system 610, a first hypervisor platform 615, and a second hypervisor platform 620, which may each represent examples of corresponding components as described with reference to FIGS. 1-5. The process flow 600 may describe a method for transferring a snapshot of a virtual machine from the first hypervisor platform 615 to the second hypervisor platform 620. The data management system 610 may be configured to interface with the first hypervisor platform 615, the second hypervisor platform 620, and the user 605 to manage the transfer of the virtual machine snapshot, as described with reference to FIGS. 1-5.

In some aspects, the operations illustrated in the process flow 600 may be performed by hardware (e.g., including circuitry, processing blocks, logic components, and other components), code (e.g., software or firmware) executed by a processor, or any combination thereof. For example, aspects of the process flow 600 may be implemented or managed by a cloud data management service, an export adapter, or some other software or application within a data management system 610 that is configured to manage backup and restoration of data and other computing resources within one or more hypervisor platforms. Alternative examples of the following may be implemented, where some steps are performed in a different order than described or are not performed at all. In some cases, steps may include additional features not mentioned below, or further steps may be added.

At 625, the user 605 may request the data management system 610 to migrate a first virtual machine from the first hypervisor platform 615 to the second hypervisor platform 620. The user 605 may transmit the request to the data management system 610 via a user interface, as described with reference to FIG. 4.

The data management system 610 may determine to transfer the data and the metadata to the second virtual machine executing on the second hypervisor platform 620 based on the request. Additionally or alternatively, the data management system 610 may detect a condition of the first hypervisor platform 615, and the data management system 610 may determine to transfer the data and the metadata to the second virtual machine executing on the second hypervisor platform 620 based on detecting the condition. The condition may be, for example, a storage capacity of the first hypervisor platform 615 being less than a threshold capacity, the first hypervisor platform 615 being subject to a ransomware attack, a disaster recovery condition for the first hypervisor platform 615, a malware infection of one or more virtual machines on the first hypervisor platform 615, some other condition indicative of a degraded performance of the first hypervisor platform 615, or any combination thereof.

At 630, the data management system 610 may obtain a snapshot of the first virtual machine executing on the first hypervisor platform 615. The snapshot (e.g., a backup) may include data and metadata associated with the first virtual machine. A format of the data and the metadata in the snapshot may be a first format that is supported by (e.g., proprietary to) the first hypervisor platform 615. The data management system 610 may obtain the snapshot periodically. For example, the data management system 610 may periodically backup the first virtual machine (e.g., and one or more other virtual machines associated with the user 605). Additionally or alternatively, the data management system 610 may obtain the snapshot in response to determining to transfer the data and the metadata.

The data management system 610 may store the snapshot of the first virtual machine in a storage location of the data management system 610 or in some other storage location, such as a cloud-based storage location, as described with reference to FIG. 4.

At 635, the data management system 610 may extract the data and the metadata from the snapshot. Extracting the data and the metadata may include retrieving the snapshot from the storage location and reading the data and the metadata included in the snapshot. At 640, the data management system 610 may determine a first virtual machine configuration of the first virtual machine executing on the first hypervisor platform 615. The data management system 610 may determine the first virtual machine configuration based on the metadata, the data, or both included in the snapshot. For example, the data management system 610 (e.g., an export adapter of the data management system 610) may extract the metadata from the snapshot and identify the first virtual machine configuration based on the metadata, as described with reference to FIG. 5. In some aspects, the data management system 610 may extract the data and the metadata at the same time, or in any order relative to each other and relative to determining the first virtual machine configuration.

At 645, the data management system 610 may convert the data and the metadata from the first format to a second format that is supported by the second hypervisor platform. The format conversion may be performed by an export adaptor or some other component of the data management system 610, as described with reference to FIG. 5.

At 650, the data management system 610 may instruct the second hypervisor platform 620 to generate the second virtual machine. In some aspects, the data management system 610 may transmit the instructions to the second hypervisor platform 620 based on determining to transfer the data and the metadata to the second virtual machine. The data management system 610 may instruct the second hypervisor platform 620 to generate the second virtual machine in accordance with a second virtual machine configuration that is based at least in part on the first virtual machine configuration of the first virtual machine. For example, the second virtual machine configuration may be the same as or similar to the first virtual machine configuration. In some aspects, the second virtual machine configuration may be adapted to be compatible with the second hypervisor platform 620.

At 655, the second hypervisor platform 620 may generate the second virtual machine based on the instructions and the second virtual machine configuration. In some aspects, the second hypervisor platform 620 may generate a new virtual machine based on the instructions. Additionally or alternatively, the second hypervisor platform 620 may identify an existing virtual machine executing on the second hypervisor platform 620 that already has the second virtual machine configuration. In such cases, the second hypervisor platform 620 may refrain from generating a new virtual machine, and the second hypervisor platform 620 may indicate the existence of the second virtual machine to the data management system 610. In some aspects, the data management system 610 may identify or determine that there is an existing virtual machine on the second hypervisor platform 620 that has the second virtual machine configuration, and the data management system 610 may refrain from transmitting the instructions to the second hypervisor platform 620 accordingly.

At 660, the data management system 610 may transfer the data and the metadata to the second virtual machine executing on the second hypervisor platform 620. Transferring the data and the metadata may include exporting the data and the metadata from the data management system 610 (e.g., or the storage location at which the snapshot is stored by the data management system 610) to the second virtual machine executing on the second hypervisor platform 620. The first virtual machine may thus be restored to the second virtual machine on the second hypervisor platform 620.

In some aspects, transferring the data and the metadata may include mounting the data and the metadata to the second virtual machine executing on the second hypervisor platform. The data and the metadata may remain stored at the data management system 610 and may be accessible to the second virtual machine while mounted to the second virtual machine. If the second virtual machine is generated in response to the instructions at 655, the mount may be referred to as a live mount. If the second virtual machine is an existing virtual machine that executes on the second hypervisor platform 620 before the data and the metadata are transferred, the mount may be referred to as instant recovery. In such cases, the data and the metadata mounted to the second virtual machine may replace previous data and metadata associated with the second virtual machine. For example, the mounted data and metadata may override or replace one or more previous applications executed by the second virtual machine.

If the data and the metadata are mounted to the second virtual machine, the data management system 610 may restore the data and the metadata to the second virtual machine on the second hypervisor platform 620 after a threshold time period. The threshold time period may start when the data and the metadata are mounted to the second virtual machine. Restoring the data and the metadata to the second virtual machine may include sending the data and the metadata from the data management system 610 to the second virtual machine.

The described techniques may thereby provide for restoration of the first virtual machine executing on the first hypervisor platform 615 to a second hypervisor platform 620 in response to a request from the user 605 or some other condition of the first hypervisor platform 615.

Figure 7:
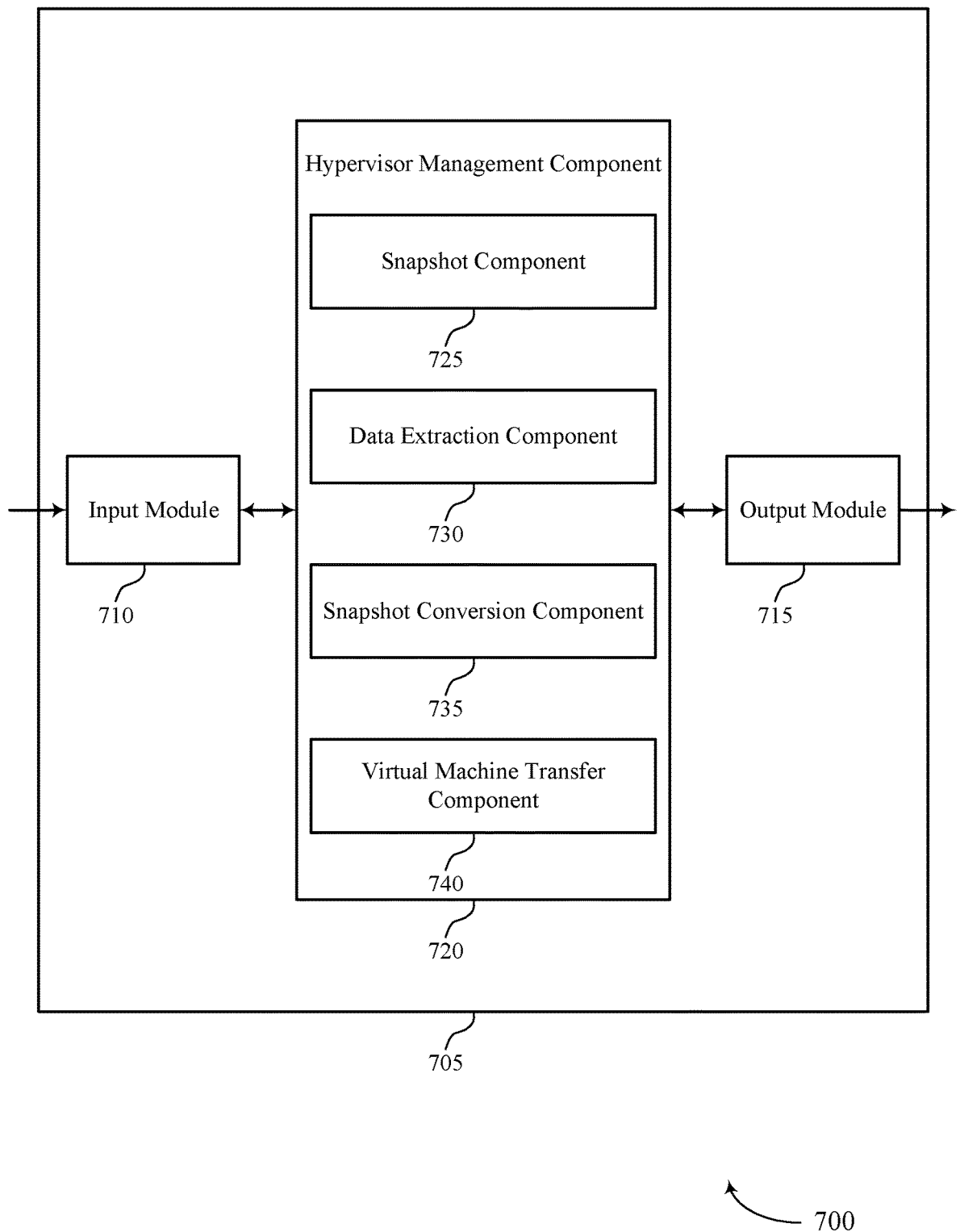
FIG. 7 shows a block diagram of an apparatus that supports snapshot-based virtual machine transfer across hypervisors in accordance with aspects of the present disclosure.

FIG. 7 shows a block diagram 700 of a device 705 that supports snapshot-based virtual machine transfer across hypervisors in accordance with aspects of the present disclosure. The device 705 may include an input module 710, an output module 715, and a hypervisor management component 720. The device 705 may also include a processor. Each of these components may be in communication with one another (e.g., via one or more buses).

The input module 710 may manage input signals for the device 705. For example, the input module 710 may identify input signals based on an interaction with a modem, a keyboard, a mouse, a touchscreen, or a similar device. These input signals may be associated with user input or processing at other components or devices. In some cases, the input module 710 may utilize an operating system such as iOS®, ANDROID®, MS-DOS®, MS-WINDOWS®, OS/2®, UNIX®, LINUX®, or another known operating system to handle input signals. The input module 710 may send aspects of these input signals to other components of the device 705 for processing. For example, the input module 710 may transmit input signals to the hypervisor management component 720 to support snapshot-based virtual machine transfer across hypervisors. In some cases, the input module 710 may be a component of a network interface 910 as described with reference to FIG. 9.

The output module 715 may manage output signals for the device 705. For example, the output module 715 may receive signals from other components of the device 705, such as the hypervisor management component 720, and may transmit these signals to other components or devices. In some examples, the output module 715 may transmit output signals for display in a user interface, for storage in a database or data store, for further processing at a server or server cluster, or for any other processes at any number of devices or systems. In some cases, the output module 715 may be a component of a network interface 910 as described with reference to FIG. 9.

For example, the hypervisor management component 720 may include a snapshot component 725, a data extraction component 730, a snapshot conversion component 735, a virtual machine transfer component 740, or any combination thereof. In some examples, the hypervisor management component 720, or various components thereof, may be configured to perform various operations (e.g., receiving, monitoring, transmitting) using or otherwise in cooperation with the input module 710, the output module 715, or both. For example, the hypervisor management component 720 may receive information from the input module 710, send information to the output module 715, or be integrated in combination with the input module 710, the output module 715, or both to receive information, transmit information, or perform various other operations as described herein.

The snapshot component 725 may be configured as or otherwise support a means for obtaining, by a data management system configured to interface with a first hypervisor platform and a second hypervisor platform, a snapshot of a first virtual machine executing on the first hypervisor platform, where the snapshot includes data and metadata associated with the first virtual machine in a first format that is supported by the first hypervisor platform. The data extraction component 730 may be configured as or otherwise support a means for extracting, by the data management system, the data and the metadata from the snapshot of the first virtual machine. The snapshot conversion component 735 may be configured as or otherwise support a means for converting, by the data management system, the data and the metadata from the first format to a second format that is supported by the second hypervisor platform. The virtual machine transfer component 740 may be configured as or otherwise support a means for transferring, by the data management system, the data and the metadata in the second format to a second virtual machine executing on the second hypervisor platform.

Figure 8:
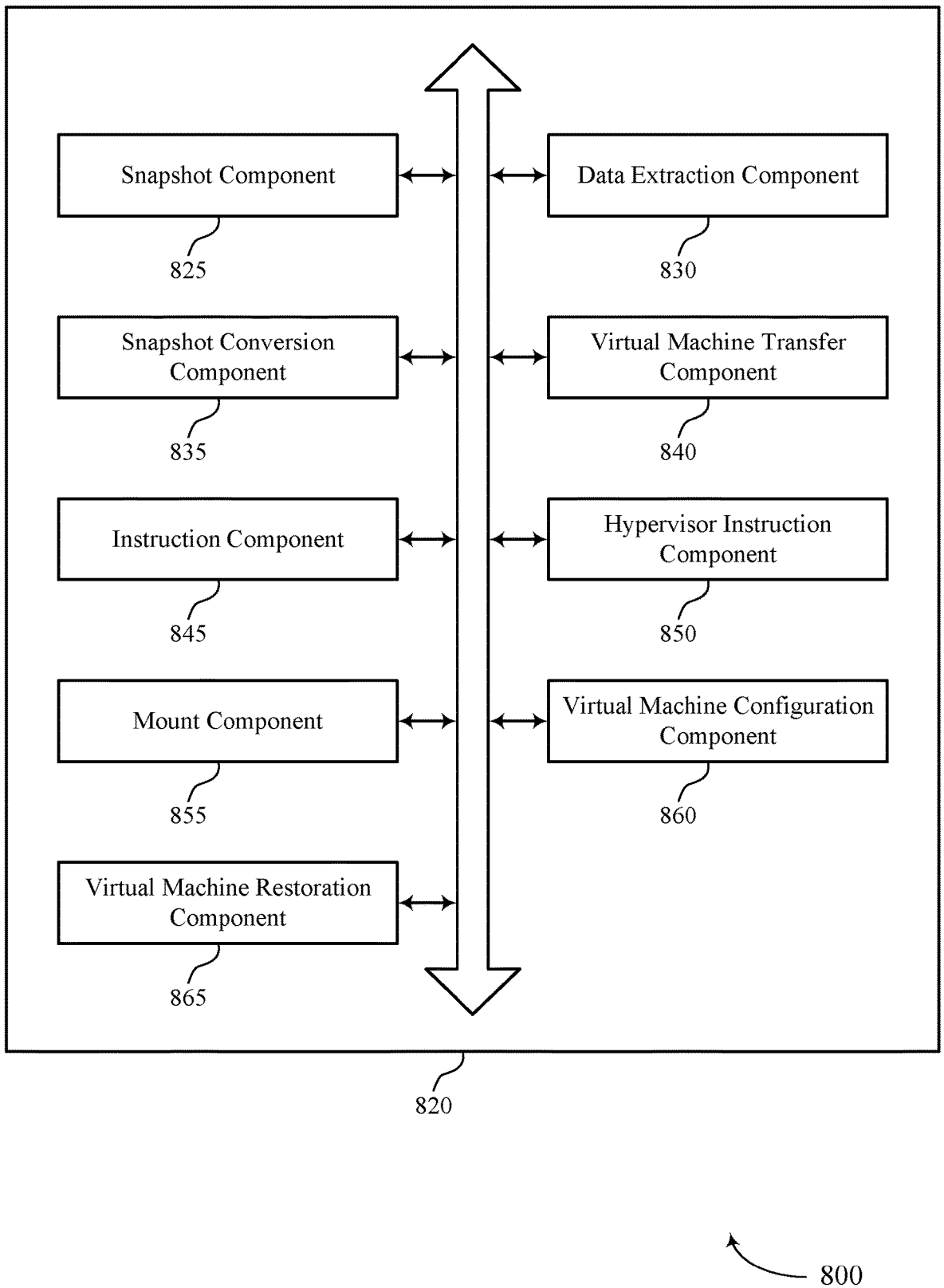
FIG. 8 shows a block diagram of a hypervisor management component that supports snapshot-based virtual machine transfer across hypervisors in accordance with aspects of the present disclosure.

FIG. 8 shows a block diagram 800 of a hypervisor management component 820 that supports snapshot-based virtual machine transfer across hypervisors in accordance with aspects of the present disclosure. The hypervisor management component 820 may be an example of aspects of a hypervisor management component or a hypervisor management component 720, or both, as described herein. The hypervisor management component 820, or various components thereof, may be an example of means for performing various aspects of snapshot-based virtual machine transfer across hypervisors as described herein. For example, the hypervisor management component 820 may include a snapshot component 825, a data extraction component 830, a snapshot conversion component 835, a virtual machine transfer component 840, an instruction component 845, a hypervisor instruction component 850, a mount component 855, a virtual machine configuration component 860, a virtual machine restoration component 865, or any combination thereof. Each of these components may communicate, directly or indirectly, with one another (e.g., via one or more buses).

The snapshot component 825 may be configured as or otherwise support a means for obtaining, by a data management system configured to interface with a first hypervisor platform and a second hypervisor platform, a snapshot of a first virtual machine executing on the first hypervisor platform, where the snapshot includes data and metadata associated with the first virtual machine in a first format that is supported by the first hypervisor platform. The data extraction component 830 may be configured as or otherwise support a means for extracting, by the data management system, the data and the metadata from the snapshot of the first virtual machine. The snapshot conversion component 835 may be configured as or otherwise support a means for converting, by the data management system, the data and the metadata from the first format to a second format that is supported by the second hypervisor platform. The virtual machine transfer component 840 may be configured as or otherwise support a means for transferring, by the data management system, the data and the metadata in the second format to a second virtual machine executing on the second hypervisor platform.

In some examples, the virtual machine transfer component 840 may be configured as or otherwise support a means for determining to transfer the data and the metadata to the second virtual machine executing on the second hypervisor platform. In some examples, the instruction component 845 may be configured as or otherwise support a means for instructing the second hypervisor platform to generate the second virtual machine based on the determination to transfer the data and the metadata. In some examples, to support transferring the data and the metadata, the virtual machine transfer component 840 may be configured as or otherwise support a means for exporting the data and the metadata from the data management system to the second virtual machine executing on the second hypervisor platform.

In some examples, the virtual machine transfer component 840 may be configured as or otherwise support a means for determining to transfer the data and the metadata to the second virtual machine executing on the second hypervisor platform. In some examples, the hypervisor instruction component 850 may be configured as or otherwise support a means for instructing the second hypervisor platform to generate the second virtual machine based on the determination to transfer the data and the metadata. In some examples, to support transferring the data and the metadata, the mount component 855 may be configured as or otherwise support a means for mounting the data and the metadata to the second virtual machine executing on the second hypervisor platform, where the data and the metadata remain stored at the data management system and are accessible to the second virtual machine while mounted to the second virtual machine.

In some examples, the virtual machine restoration component 865 may be configured as or otherwise support a means for restoring the data and the metadata to the second virtual machine executing on the second hypervisor platform within a threshold time period, where the threshold time period starts when the data and the metadata are mounted to the second virtual machine, and where the data and the metadata are sent to the second virtual machine based on restoring the data and the metadata to the second virtual machine.

In some examples, to support transferring the data and the metadata, the mount component 855 may be configured as or otherwise support a means for mounting the data and the metadata to the second virtual machine executing on the second hypervisor platform, where the second virtual machine has a second configuration that is the same as a first configuration of the first virtual machine executing on the first hypervisor platform. In some examples, the data and the metadata mounted to the second virtual machine replace previous data and metadata associated with the second virtual machine executing on the second hypervisor platform.

In some examples, the virtual machine configuration component 860 may be configured as or otherwise support a means for determining, by the data management system based on the metadata included in the snapshot, a first virtual machine configuration of the first virtual machine executing on the first hypervisor platform. In some examples, the hypervisor instruction component 850 may be configured as or otherwise support a means for instructing the second hypervisor platform to generate the second virtual machine in accordance with a second virtual machine configuration that is based on the first virtual machine configuration of the first virtual machine.

In some examples, the virtual machine transfer component 840 may be configured as or otherwise support a means for receiving a request to migrate the first virtual machine from the first hypervisor platform to the second hypervisor platform, where transferring the data and the metadata to the second virtual machine executing on the second hypervisor platform is based on the request.

In some examples, the virtual machine transfer component 840 may be configured as or otherwise support a means for detecting a condition of the first hypervisor platform, where transferring the data and the metadata to the second virtual machine executing on the second hypervisor platform is based on detecting the condition.

In some examples, the condition includes a storage capacity of the first hypervisor platform being less than a threshold capacity, the first hypervisor platform being subject to a ransomware attack, a disaster recovery condition of the first hypervisor platform, or any combination thereof.

In some examples, the virtual machine restoration component 865 may be configured as or otherwise support a means for receiving a request to recover the first virtual machine. In some examples, the virtual machine restoration component 865 may be configured as or otherwise support a means for recovering, based on the request, the first virtual machine from the second hypervisor platform using the data and the metadata transferred to the second virtual machine executing on the second hypervisor platform.

Figure 9:
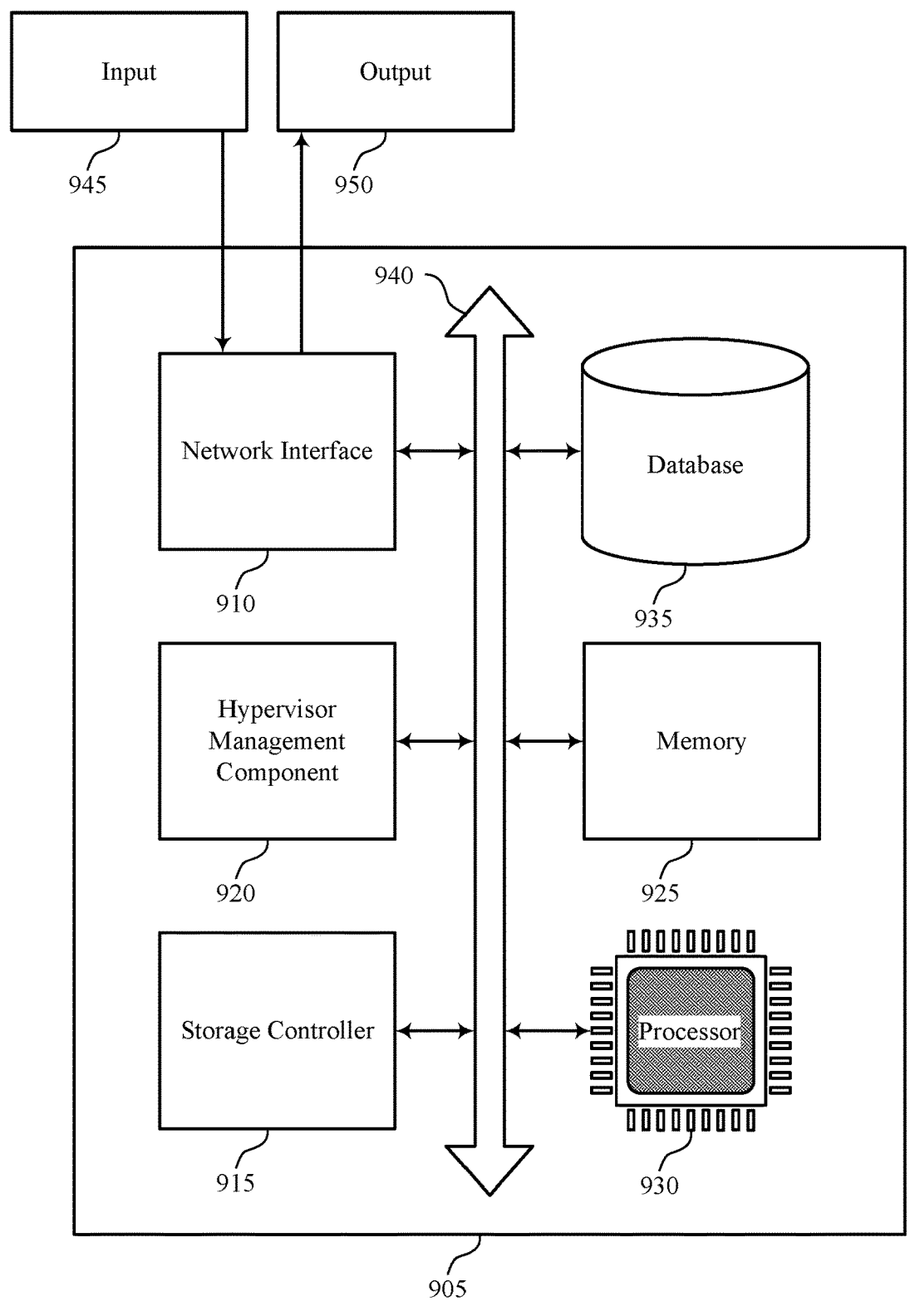
FIG. 9 shows a diagram of a system including a device that supports snapshot-based virtual machine transfer across hypervisors in accordance with aspects of the present disclosure.

FIG. 9 shows a diagram of a system 900 including a device 905 that supports snapshot-based virtual machine transfer across hypervisors in accordance with aspects of the present disclosure. The device 905 may be an example of or include the components of a device 705 as described herein. The device 905 may include components for bi-directional data communications including components for transmitting and receiving communications, such as a hypervisor management component 920, a network interface 910, a storage controller 915, a memory 925, a processor 930, and a database 935. These components may be in electronic communication or otherwise coupled (e.g., operatively, communicatively, functionally, electronically, electrically) via one or more buses (e.g., a bus 940).

The network interface 910 may manage input signals 945 and output signals 950 for the device 905. The network interface 910 may also manage peripherals not integrated into the device 905. In some cases, the network interface 910 may represent a physical connection or port to an external peripheral. In some cases, the network interface 910 may utilize an operating system such as iOS®, ANDROID®, MS-DOS®, MS-WINDOWS®, OS/2®, UNIX®, LINUX®, or another known operating system. In other cases, the network interface 910 may represent or interact with a modem, a keyboard, a mouse, a touchscreen, or a similar device. In some cases, the network interface 910 may be implemented as part of a processor 930. In some examples, a user may interact with the device 905 via the network interface 910 or via hardware components controlled by the network interface 910.

The storage controller 915 may manage data storage and processing in a database 935. In some cases, a user may interact with the storage controller 915. In other cases, the storage controller 915 may operate automatically without user interaction. The database 935 may be an example of a single database, a distributed database, multiple distributed databases, a data store, a data lake, or an emergency backup database.

Memory 925 may include random-access memory (RAM) and ROM. The memory 925 may store computer-readable, computer-executable software including instructions that, when executed, cause the processor 930 to perform various functions described herein. In some cases, the memory 925 may contain, among other things, a BIOS which may control basic hardware or software operation such as the interaction with peripheral components or devices.

The processor 930 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 930 may be configured to operate a memory array using a memory controller. In other cases, a memory controller may be integrated into the processor 930. The processor 930 may be configured to execute computer-readable instructions stored in a memory 925 to perform various functions (e.g., functions or tasks supporting snapshot-based virtual machine transfer across hypervisors).

For example, the hypervisor management component 920 may be configured as or otherwise support a means for obtaining, by a data management system configured to interface with a first hypervisor platform and a second hypervisor platform, a snapshot of a first virtual machine executing on the first hypervisor platform, where the snapshot includes data and metadata associated with the first virtual machine in a first format that is supported by the first hypervisor platform. The hypervisor management component 920 may be configured as or otherwise support a means for extracting, by the data management system, the data and the metadata from the snapshot of the first virtual machine. The hypervisor management component 920 may be configured as or otherwise support a means for converting, by the data management system, the data and the metadata from the first format to a second format that is supported by the second hypervisor platform. The hypervisor management component 920 may be configured as or otherwise support a means for transferring, by the data management system, the data and the metadata in the second format to a second virtual machine executing on the second hypervisor platform.

By including or configuring the hypervisor management component 920 in accordance with examples as described herein, the device 905 may support techniques for improved reliability and security associated with data backup and restoration across hypervisor platforms, reduced latency and complexity associated with migrating data and other computing resources between hypervisors, and more efficient utilization of communication resources. Additionally or alternatively, the device 905 may provide for reduced costs for a customer.

Figure 10:
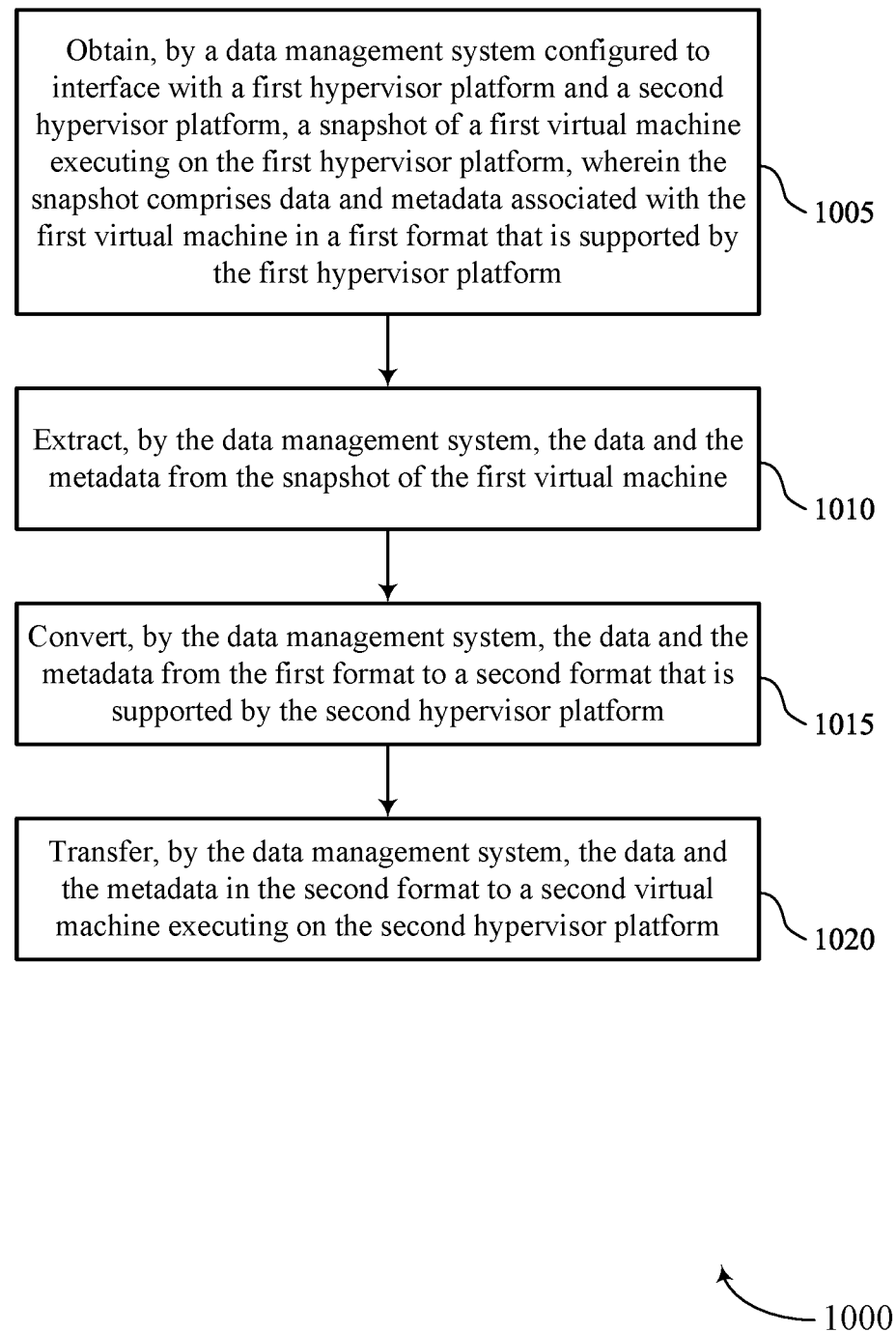
FIGS. 10 through 13 show flowcharts illustrating methods that support snapshot-based virtual machine transfer across hypervisors in accordance with aspects of the present disclosure.

FIG. 10 shows a flowchart illustrating a method 1000 that supports snapshot-based virtual machine transfer across hypervisors in accordance with aspects of the present disclosure. The operations of the method 1000 may be implemented by a data management system or its components as described herein. For example, the operations of the method 1000 may be performed by a data management system as described with reference to FIGS. 1 through 9. In some examples, a data management system may execute a set of instructions to control the functional elements of the data management system to perform the described functions. Additionally, or alternatively, the data management system may perform aspects of the described functions using special-purpose hardware.

At 1005, the method may include obtaining, by a data management system configured to interface with a first hypervisor platform and a second hypervisor platform, a snapshot of a first virtual machine executing on the first hypervisor platform, where the snapshot includes data and metadata associated with the first virtual machine in a first format that is supported by the first hypervisor platform. The operations of 1005 may be performed in accordance with examples as disclosed herein. In some examples, aspects of the operations of 1005 may be performed by a snapshot component 825 as described with reference to FIG. 8.

At 1010, the method may include extracting, by the data management system, the data and the metadata from the snapshot of the first virtual machine. The operations of 1010 may be performed in accordance with examples as disclosed herein. In some examples, aspects of the operations of 1010 may be performed by a data extraction component 830 as described with reference to FIG. 8.

At 1015, the method may include converting, by the data management system, the data and the metadata from the first format to a second format that is supported by the second hypervisor platform. The operations of 1015 may be performed in accordance with examples as disclosed herein. In some examples, aspects of the operations of 1015 may be performed by a snapshot conversion component 835 as described with reference to FIG. 8.

At 1020, the method may include transferring, by the data management system, the data and the metadata in the second format to a second virtual machine executing on the second hypervisor platform. The operations of 1020 may be performed in accordance with examples as disclosed herein. In some examples, aspects of the operations of 1020 may be performed by a virtual machine transfer component 840 as described with reference to FIG. 8.

Figure 11:
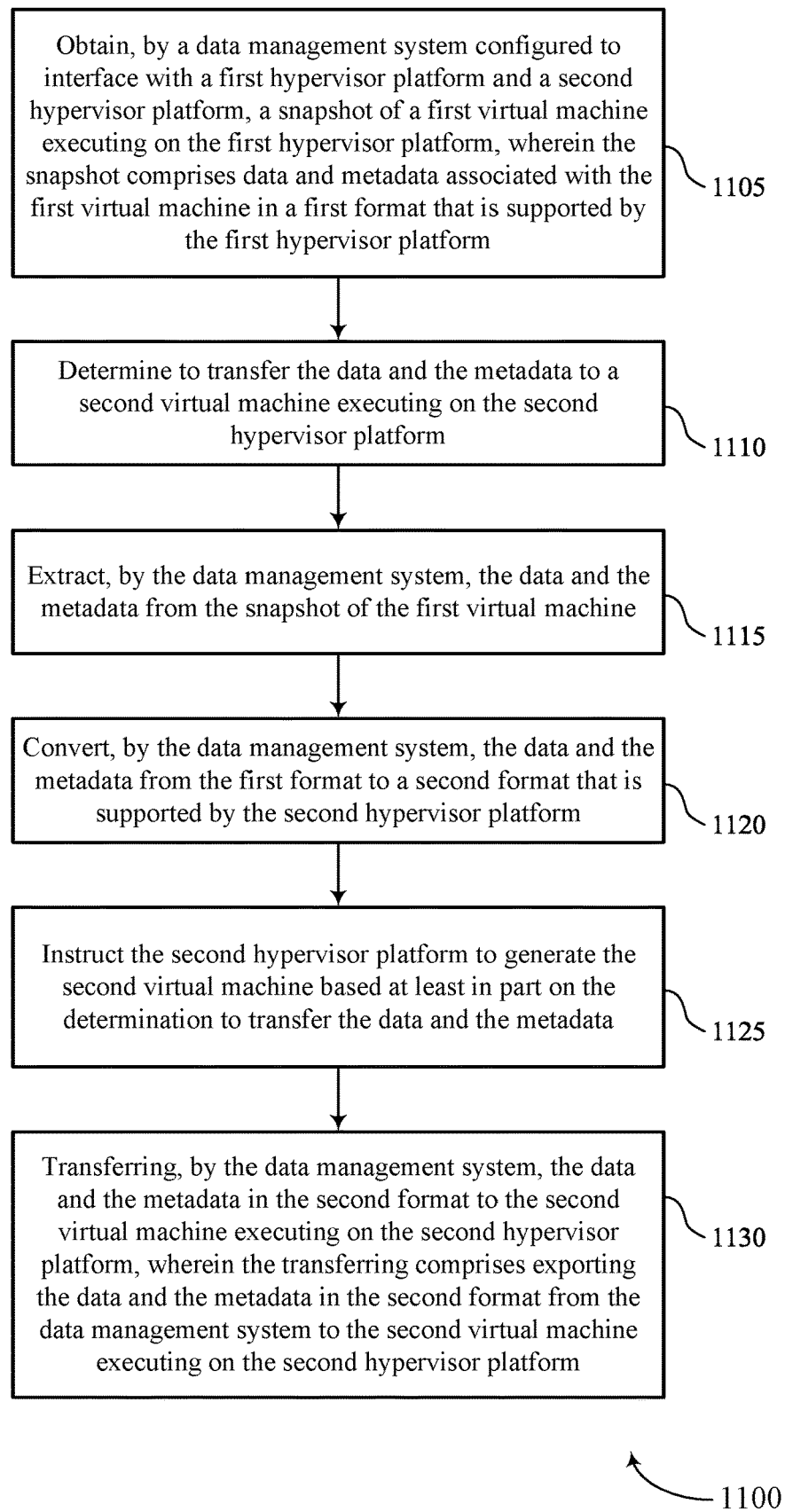

FIG. 11 shows a flowchart illustrating a method 1100 that supports snapshot-based virtual machine transfer across hypervisors in accordance with aspects of the present disclosure. The operations of the method 1100 may be implemented by a data management system or its components as described herein. For example, the operations of the method 1100 may be performed by a data management system as described with reference to FIGS. 1 through 9. In some examples, a data management system may execute a set of instructions to control the functional elements of the data management system to perform the described functions. Additionally, or alternatively, the data management system may perform aspects of the described functions using special-purpose hardware.

At 1105, the method may include obtaining, by a data management system configured to interface with a first hypervisor platform and a second hypervisor platform, a snapshot of a first virtual machine executing on the first hypervisor platform, where the snapshot includes data and metadata associated with the first virtual machine in a first format that is supported by the first hypervisor platform. The operations of 1105 may be performed in accordance with examples as disclosed herein. In some examples, aspects of the operations of 1105 may be performed by a snapshot component 825 as described with reference to FIG. 8.

At 1110, the method may include determining to transfer the data and the metadata to the second virtual machine executing on the second hypervisor platform. The operations of 1110 may be performed in accordance with examples as disclosed herein. In some examples, aspects of the operations of 1110 may be performed by a virtual machine transfer component 840 as described with reference to FIG. 8.

At 1115, the method may include extracting, by the data management system, the data and the metadata from the snapshot of the first virtual machine. The operations of 1115 may be performed in accordance with examples as disclosed herein. In some examples, aspects of the operations of 1115 may be performed by a data extraction component 830 as described with reference to FIG. 8.

At 1120, the method may include converting, by the data management system, the data and the metadata from the first format to a second format that is supported by the second hypervisor platform. The operations of 1120 may be performed in accordance with examples as disclosed herein. In some examples, aspects of the operations of 1120 may be performed by a snapshot conversion component 835 as described with reference to FIG. 8.

At 1125, the method may include instructing the second hypervisor platform to generate the second virtual machine based on the determination to transfer the data and the metadata. The operations of 1125 may be performed in accordance with examples as disclosed herein. In some examples, aspects of the operations of 1125 may be performed by an instruction component 845 as described with reference to FIG. 8.

At 1130, the method may include transferring, by the data management system, the data and the metadata in the second format to the second virtual machine executing on the second hypervisor platform, where the transferring includes exporting the data and the metadata from the data management system to the second virtual machine executing on the second hypervisor platform. The operations of 1130 may be performed in accordance with examples as disclosed herein. In some examples, aspects of the operations of 1130 may be performed by a virtual machine transfer component 840 as described with reference to FIG. 8.

Figure 12:
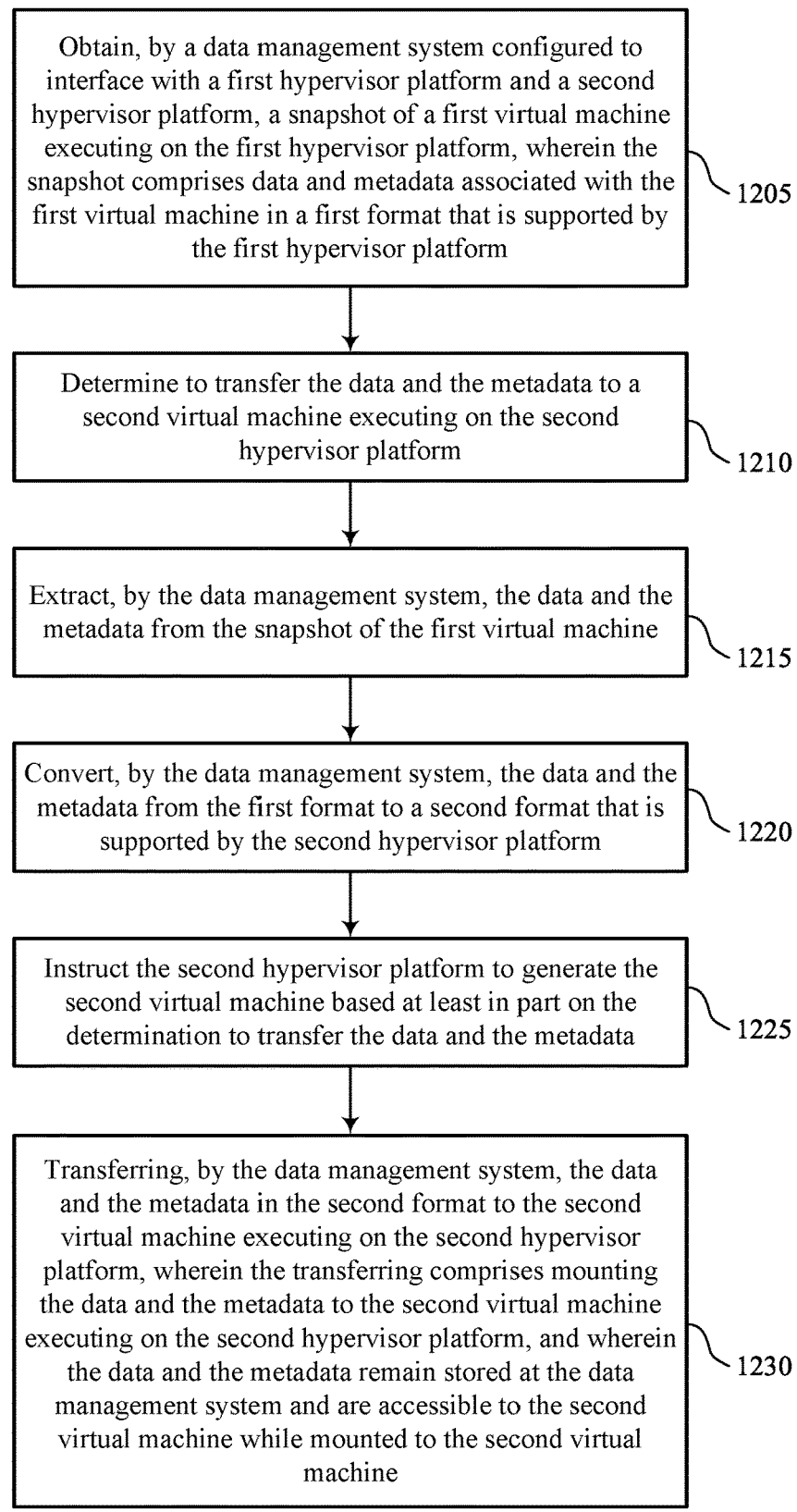

FIG. 12 shows a flowchart illustrating a method 1200 that supports snapshot-based virtual machine transfer across hypervisors in accordance with aspects of the present disclosure. The operations of the method 1200 may be implemented by a data management system or its components as described herein. For example, the operations of the method 1200 may be performed by a data management system as described with reference to FIGS. 1 through 9. In some examples, a data management system may execute a set of instructions to control the functional elements of the data management system to perform the described functions. Additionally, or alternatively, the data management system may perform aspects of the described functions using special-purpose hardware.

At 1205, the method may include obtaining, by a data management system configured to interface with a first hypervisor platform and a second hypervisor platform, a snapshot of a first virtual machine executing on the first hypervisor platform, where the snapshot includes data and metadata associated with the first virtual machine in a first format that is supported by the first hypervisor platform. The operations of 1205 may be performed in accordance with examples as disclosed herein. In some examples, aspects of the operations of 1205 may be performed by a snapshot component 825 as described with reference to FIG. 8.

At 1210, the method may include determining to transfer the data and the metadata to the second virtual machine executing on the second hypervisor platform. The operations of 1210 may be performed in accordance with examples as disclosed herein. In some examples, aspects of the operations of 1210 may be performed by a virtual machine transfer component 840 as described with reference to FIG. 8.

At 1215, the method may include extracting, by the data management system, the data and the metadata from the snapshot of the first virtual machine. The operations of 1215 may be performed in accordance with examples as disclosed herein. In some examples, aspects of the operations of 1215 may be performed by a data extraction component 830 as described with reference to FIG. 8.

At 1220, the method may include converting, by the data management system, the data and the metadata from the first format to a second format that is supported by the second hypervisor platform. The operations of 1220 may be performed in accordance with examples as disclosed herein. In some examples, aspects of the operations of 1220 may be performed by a snapshot conversion component 835 as described with reference to FIG. 8.

At 1225, the method may include instructing the second hypervisor platform to generate the second virtual machine based on the determination to transfer the data and the metadata. The operations of 1225 may be performed in accordance with examples as disclosed herein. In some examples, aspects of the operations of 1225 may be performed by a hypervisor instruction component 850 as described with reference to FIG. 8.

At 1230, the method may include transferring, by the data management system, the data and the metadata in the second format to the second virtual machine executing on the second hypervisor platform, where the transferring includes mounting the data and the metadata to the second virtual machine executing on the second hypervisor platform, and where the data and the metadata remain stored at the data management system and are accessible to the second virtual machine while mounted to the second virtual machine. The operations of 1230 may be performed in accordance with examples as disclosed herein. In some examples, aspects of the operations of 1230 may be performed by a virtual machine transfer component 840, a mount component 855, or both as described with reference to FIG. 8.

Figure 13:
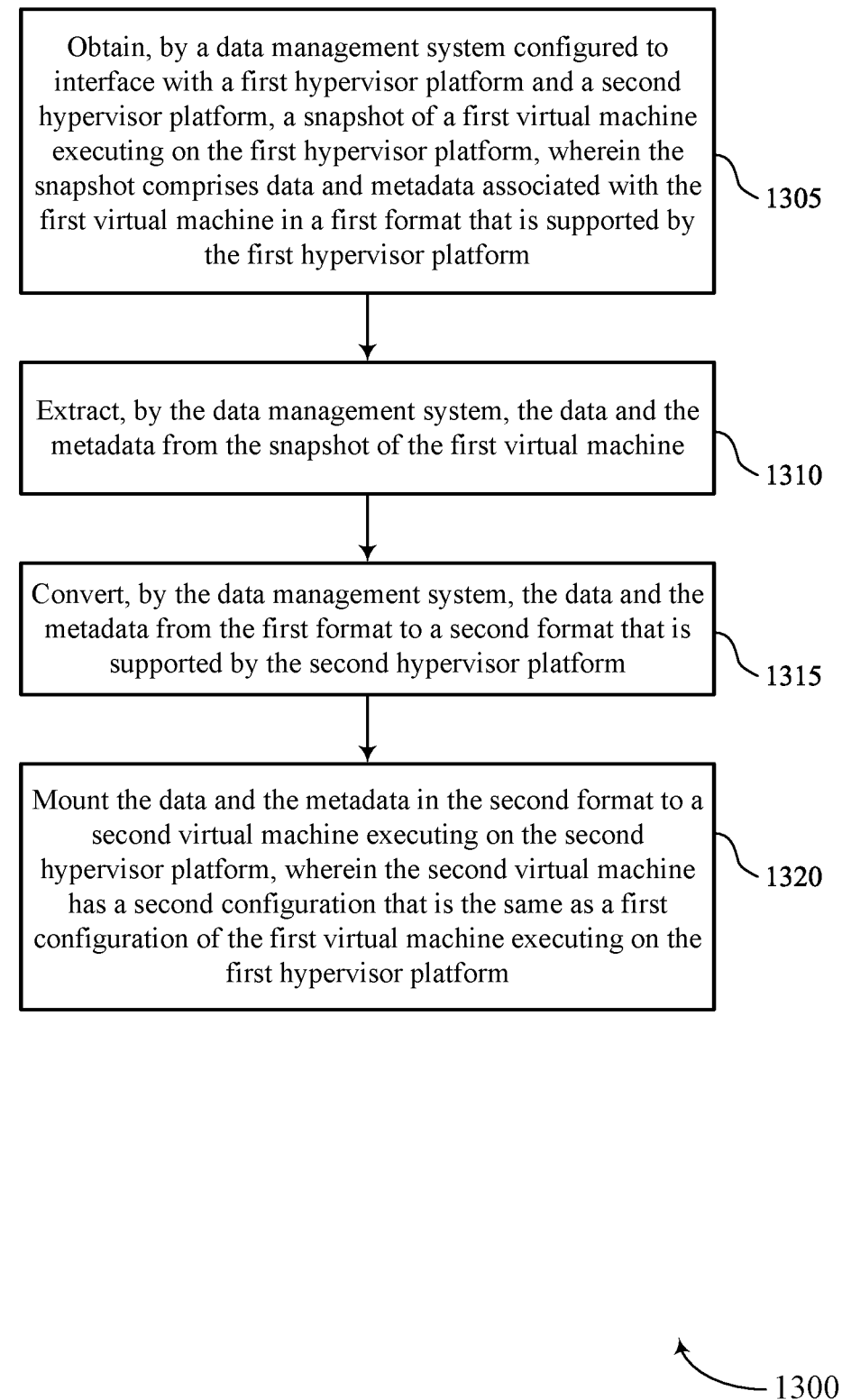

FIG. 13 shows a flowchart illustrating a method 1300 that supports snapshot-based virtual machine transfer across hypervisors in accordance with aspects of the present disclosure. The operations of the method 1300 may be implemented by a data management system or its components as described herein. For example, the operations of the method 1300 may be performed by a data management system as described with reference to FIGS. 1 through 9. In some examples, a data management system may execute a set of instructions to control the functional elements of the data management system to perform the described functions. Additionally, or alternatively, the data management system may perform aspects of the described functions using special-purpose hardware.

At 1305, the method may include obtaining, by a data management system configured to interface with a first hypervisor platform and a second hypervisor platform, a snapshot of a first virtual machine executing on the first hypervisor platform, where the snapshot includes data and metadata associated with the first virtual machine in a first format that is supported by the first hypervisor platform. The operations of 1305 may be performed in accordance with examples as disclosed herein. In some examples, aspects of the operations of 1305 may be performed by a snapshot component 825 as described with reference to FIG. 8.

At 1310, the method may include extracting, by the data management system, the data and the metadata from the snapshot of the first virtual machine. The operations of 1310 may be performed in accordance with examples as disclosed herein. In some examples, aspects of the operations of 1310 may be performed by a data extraction component 830 as described with reference to FIG. 8.

At 1315, the method may include converting, by the data management system, the data and the metadata from the first format to a second format that is supported by the second hypervisor platform. The operations of 1315 may be performed in accordance with examples as disclosed herein. In some examples, aspects of the operations of 1315 may be performed by a snapshot conversion component 835 as described with reference to FIG. 8.

At 1320, the method may include mounting the data and the metadata to the second virtual machine executing on the second hypervisor platform, where the second virtual machine has a second configuration that is the same as a first configuration of the first virtual machine executing on the first hypervisor platform. The operations of 1320 may be performed in accordance with examples as disclosed herein. In some examples, aspects of the operations of 1320 may be performed by a mount component 855 as described with reference to FIG. 8.

A method is described. The method may include obtaining, by a data management system configured to interface with a first hypervisor platform and a second hypervisor platform, a snapshot of a first virtual machine executing on the first hypervisor platform, where the snapshot includes data and metadata associated with the first virtual machine in a first format that is supported by the first hypervisor platform, extracting, by the data management system, the data and the metadata from the snapshot of the first virtual machine, converting, by the data management system, the data and the metadata from the first format to a second format that is supported by the second hypervisor platform, and transferring, by the data management system, the data and the metadata in the second format to a second virtual machine executing on the second hypervisor platform.

An apparatus is described. The apparatus may include a processor, memory coupled with the processor, and instructions stored in the memory. The instructions may be executable by the processor to cause the apparatus to obtain, by a data management system configured to interface with a first hypervisor platform and a second hypervisor platform, a snapshot of a first virtual machine executing on the first hypervisor platform, where the snapshot includes data and metadata associated with the first virtual machine in a first format that is supported by the first hypervisor platform, extract, by the data management system, the data and the metadata from the snapshot of the first virtual machine, convert, by the data management system, the data and the metadata from the first format to a second format that is supported by the second hypervisor platform, and transfer, by the data management system, the data and the metadata in the second format to a second virtual machine executing on the second hypervisor platform.

Another apparatus is described. The apparatus may include means for obtaining, by a data management system configured to interface with a first hypervisor platform and a second hypervisor platform, a snapshot of a first virtual machine executing on the first hypervisor platform, where the snapshot includes data and metadata associated with the first virtual machine in a first format that is supported by the first hypervisor platform, means for extracting, by the data management system, the data and the metadata from the snapshot of the first virtual machine, means for converting, by the data management system, the data and the metadata from the first format to a second format that is supported by the second hypervisor platform, and means for transferring, by the data management system, the data and the metadata in the second format to a second virtual machine executing on the second hypervisor platform.

A non-transitory computer-readable medium storing code is described. The code may include instructions executable by a processor to obtain, by a data management system configured to interface with a first hypervisor platform and a second hypervisor platform, a snapshot of a first virtual machine executing on the first hypervisor platform, where the snapshot includes data and metadata associated with the first virtual machine in a first format that is supported by the first hypervisor platform, extract, by the data management system, the data and the metadata from the snapshot of the first virtual machine, convert, by the data management system, the data and the metadata from the first format to a second format that is supported by the second hypervisor platform, and transfer, by the data management system, the data and the metadata in the second format to a second virtual machine executing on the second hypervisor platform.

Some examples of the method, apparatuses, and non-transitory computer-readable medium described herein may further include operations, features, means, or instructions for determining to transfer the data and the metadata to the second virtual machine executing on the second hypervisor platform and instructing the second hypervisor platform to generate the second virtual machine based on the determination to transfer the data and the metadata, where operations, features, means, or instructions for transferring the data and the metadata include operations, features, means, or instructions for exporting the data and the metadata from the data management system to the second virtual machine executing on the second hypervisor platform.

Some examples of the method, apparatuses, and non-transitory computer-readable medium described herein may further include operations, features, means, or instructions for determining to transfer the data and the metadata to the second virtual machine executing on the second hypervisor platform and instructing the second hypervisor platform to generate the second virtual machine based on the determination to transfer the data and the metadata, where operations, features, means, or instructions for transferring the data and the metadata include operations, features, means, or instructions for mounting the data and the metadata to the second virtual machine executing on the second hypervisor platform, where the data and the metadata remain stored at the data management system and may be accessible to the second virtual machine while mounted to the second virtual machine.

Some examples of the method, apparatuses, and non-transitory computer-readable medium described herein may further include operations, features, means, or instructions for restoring the data and the metadata to the second virtual machine executing on the second hypervisor platform within a threshold time period, where the threshold time period starts when the data and the metadata may be mounted to the second virtual machine, and where the data and the metadata may be sent to the second virtual machine based on restoring the data and the metadata to the second virtual machine.

In some examples of the method, apparatuses, and non-transitory computer-readable medium described herein, operations, features, means, or instructions for transferring the data and the metadata may include operations, features, means, or instructions for mounting the data and the metadata to the second virtual machine executing on the second hypervisor platform, where the second virtual machine may have a second configuration that may be the same as a first configuration of the first virtual machine executing on the first hypervisor platform.

In some examples of the method, apparatuses, and non-transitory computer-readable medium described herein, the data and the metadata mounted to the second virtual machine replace previous data and metadata associated with the second virtual machine executing on the second hypervisor platform.

Some examples of the method, apparatuses, and non-transitory computer-readable medium described herein may further include operations, features, means, or instructions for determining, by the data management system based on the metadata included in the snapshot, a first virtual machine configuration of the first virtual machine executing on the first hypervisor platform.

Some examples of the method, apparatuses, and non-transitory computer-readable medium described herein may further include operations, features, means, or instructions for instructing the second hypervisor platform to generate the second virtual machine in accordance with a second virtual machine configuration that may be based on the first virtual machine configuration of the first virtual machine.

Some examples of the method, apparatuses, and non-transitory computer-readable medium described herein may further include operations, features, means, or instructions for receiving a request to migrate the first virtual machine from the first hypervisor platform to the second hypervisor platform, where transferring the data and the metadata to the second virtual machine executing on the second hypervisor platform may be based on the request.

Some examples of the method, apparatuses, and non-transitory computer-readable medium described herein may further include operations, features, means, or instructions for detecting a condition of the first hypervisor platform, where transferring the data and the metadata to the second virtual machine executing on the second hypervisor platform may be based on detecting the condition.

In some examples of the method, apparatuses, and non-transitory computer-readable medium described herein, the condition may be a storage capacity of the first hypervisor platform being less than a threshold capacity, the first hypervisor platform being subject to a ransomware attack, a disaster recovery condition of the first hypervisor platform, or any combination thereof.

Some examples of the method, apparatuses, and non-transitory computer-readable medium described herein may further include operations, features, means, or instructions for receiving a request to recover the first virtual machine and recovering, based on the request, the first virtual machine from the second hypervisor platform using the data and the metadata transferred to the second virtual machine executing on the second hypervisor platform.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
   obtaining, by a data management system configured to interface with a first hypervisor platform and a second hypervisor platform, a snapshot of a first virtual machine executing on the first hypervisor platform, wherein the snapshot comprises data and metadata associated with the first virtual machine in a first format that is supported by the first hypervisor platform;
   storing the snapshot in a storage location of the data management system after obtaining the snapshot;
   extracting, by the data management system, the data and the metadata from the snapshot of the first virtual machine stored in the storage location of the data management system;
   converting, by the data management system, the data and the metadata from the first format to a second format that is supported by the second hypervisor platform; and
   transferring, by the data management system, the data and the metadata in the second format from the storage location of the data management system to a second virtual machine executing on the second hypervisor platform.

2. The method of claim 1, further comprising:
   determining to transfer the data and the metadata to the second virtual machine executing on the second hypervisor platform; and
   instructing the second hypervisor platform to generate the second virtual machine based at least in part on the determination to transfer the data and the metadata, wherein transferring the data and the metadata comprises:
      exporting the data and the metadata from the data management system to the second virtual machine executing on the second hypervisor platform.

3. The method of claim 1, further comprising:
   determining to transfer the data and the metadata to the second virtual machine executing on the second hypervisor platform; and instructing the second hypervisor platform to generate the second virtual machine based at least in part on the determination to transfer the data and the metadata, wherein transferring the data and the metadata comprises:

mounting the data and the metadata to the second virtual machine executing on the second hypervisor platform, wherein the data and the metadata remain stored at the data management system and are accessible to the second virtual machine while mounted to the second virtual machine.

4. The method of claim 3, further comprising:

restoring the data and the metadata to the second virtual machine executing on the second hypervisor platform within a threshold time period, wherein the threshold time period starts when the data and the metadata are mounted to the second virtual machine, and wherein the data and the metadata are sent to the second virtual machine based at least in part on restoring the data and the metadata to the second virtual machine.

5. The method of claim 1, wherein transferring the data and the metadata comprises:

mounting the data and the metadata to the second virtual machine executing on the second hypervisor platform, wherein the second virtual machine has a second configuration that is the same as a first configuration of the first virtual machine executing on the first hypervisor platform.

6. The method of claim 5, wherein the data and the metadata mounted to the second virtual machine replace previous data and metadata associated with the second virtual machine executing on the second hypervisor platform.

7. The method of claim 1, further comprising:

determining, by the data management system based at least in part on the metadata included in the snapshot, a first virtual machine configuration of the first virtual machine executing on the first hypervisor platform.

8. The method of claim 7, further comprising:

instructing the second hypervisor platform to generate the second virtual machine in accordance with a second virtual machine configuration that is based at least in part on the first virtual machine configuration of the first virtual machine.

9. The method of claim 1, further comprising:

receiving a request to migrate the first virtual machine from the first hypervisor platform to the second hypervisor platform, wherein transferring the data and the metadata to the second virtual machine executing on the second hypervisor platform is based at least in part on the request.

10. The method of claim 1, further comprising:

detecting a condition of the first hypervisor platform, wherein transferring the data and the metadata to the second virtual machine executing on the second hypervisor platform is based at least in part on detecting the condition.

11. The method of claim 10, wherein the condition comprises a storage capacity of the first hypervisor platform being less than a threshold capacity, the first hypervisor platform being subject to a ransomware attack, a disaster recovery condition of the first hypervisor platform, or any combination thereof.

12. The method of claim 1, further comprising:

receiving a request to recover the first virtual machine; and recovering, based at least in part on the request, the first virtual machine from the second hypervisor platform using the data and the metadata transferred to the second virtual machine executing on the second hypervisor platform.

13. An apparatus, comprising:

one or more processors;

one or more memories coupled with the one or more processors; and instructions stored in the one or more memories and executable by the one or more processors to cause the apparatus to:

obtain, by a data management system configured to interface with a first hypervisor platform and a second hypervisor platform, a snapshot of a first virtual machine executing on the first hypervisor platform, wherein the snapshot comprises data and metadata associated with the first virtual machine in a first format that is supported by the first hypervisor platform;

store the snapshot in a storage location of the data management system after obtaining the snapshot;

extract, by the data management system, the data and the metadata from the snapshot of the first virtual machine stored in the storage location of the data management system;

convert, by the data management system, the data and the metadata from the first format to a second format that is supported by the second hypervisor platform; and transfer, by the data management system, the data and the metadata in the second format from the storage location of the data management system to a second virtual machine executing on the second hypervisor platform.

14. The apparatus of claim 13, wherein the instructions are further executable by the one or more processors to cause the apparatus to:

determine to transfer the data and the metadata to the second virtual machine executing on the second hypervisor platform; and instruct the second hypervisor platform to generate the second virtual machine based at least in part on the determination to transfer the data and the metadata, wherein, to transfer the data and the metadata, the instructions are executable by the one or more processors to cause the apparatus to:

export the data and the metadata from the data management system to the second virtual machine executing on the second hypervisor platform.

15. The apparatus of claim 13, wherein the instructions are further executable by the one or more processors to cause the apparatus to:

determine to transfer the data and the metadata to the second virtual machine executing on the second hypervisor platform; and instruct the second hypervisor platform to generate the second virtual machine based at least in part on the determination to transfer the data and the metadata, wherein, to transfer the data and the metadata, the instructions are executable by the one or more processors to cause the apparatus to:

mount the data and the metadata to the second virtual machine executing on the second hypervisor platform, wherein the data and the metadata remain stored at the data management system and are accessible to the second virtual machine while mounted to the second virtual machine.

16. The apparatus of claim 13, wherein, to transfer the data and the metadata, the instructions are executable by the one or more processors to cause the apparatus to:
mount the data and the metadata to the second virtual machine executing on the second hypervisor platform, wherein the second virtual machine has a second configuration that is the same as a first configuration of the first virtual machine executing on the first hypervisor platform.

17. A non-transitory computer-readable medium storing code, the code comprising instructions executable by one or more processors to:
obtain, by a data management system configured to interface with a first hypervisor platform and a second hypervisor platform, a snapshot of a first virtual machine executing on the first hypervisor platform, wherein the snapshot comprises data and metadata associated with the first virtual machine in a first format that is supported by the first hypervisor platform;
store the snapshot in a storage location of the data management system after obtaining the snapshot;
extract, by the data management system, the data and the metadata from the snapshot of the first virtual machine stored in the storage location of the data management system;
convert, by the data management system, the data and the metadata from the first format to a second format that is supported by the second hypervisor platform; and
transfer, by the data management system, the data and the metadata in the second format from the storage location of the data management system to a second virtual machine executing on the second hypervisor platform.

18. The non-transitory computer-readable medium of claim 17, wherein the instructions are further executable by the one or more processors to:
determine to transfer the data and the metadata to the second virtual machine executing on the second hypervisor platform; and
instruct the second hypervisor platform to generate the second virtual machine based at least in part on the determination to transfer the data and the metadata, wherein, to transfer the data and the metadata, the instructions are executable by the one or more processors to:
export the data and the metadata from the data management system to the second virtual machine executing on the second hypervisor platform.

19. The non-transitory computer-readable medium of claim 17, wherein the instructions are further executable by the one or more processors to:
determine to transfer the data and the metadata to the second virtual machine executing on the second hypervisor platform; and
instruct the second hypervisor platform to generate the second virtual machine based at least in part on the determination to transfer the data and the metadata, wherein, to transfer the data and the metadata, the instructions are executable by the one or more processors to:
mount the data and the metadata to the second virtual machine executing on the second hypervisor platform, wherein the data and the metadata remain stored at the data management system and are accessible to the second virtual machine while mounted to the second virtual machine.

20. The non-transitory computer-readable medium of claim 17, wherein, to transfer the data and the metadata, the instructions are executable by the one or more processors to:
mount the data and the metadata to the second virtual machine executing on the second hypervisor platform, wherein the second virtual machine has a second configuration that is the same as a first configuration of the first virtual machine executing on the first hypervisor platform.

* * * * *